United States Patent
Ishikawa

(10) Patent No.: US 12,270,902 B2
(45) Date of Patent: Apr. 8, 2025

(54) OBJECT DETECTION APPARATUS, OBJECT DETECTION METHOD, AND NON-TRANSITORY COMPUTER READABLE-MEDIUM

(71) Applicant: Mitsubishi Electric Corporation, Tokyo (JP)

(72) Inventor: Kentaro Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 99 days.

(21) Appl. No.: 18/238,745

(22) Filed: Aug. 28, 2023

(65) Prior Publication Data

US 2023/0400572 A1  Dec. 14, 2023

Related U.S. Application Data

(63) Continuation of application No. PCT/JP2021/016061, filed on Apr. 20, 2021.

(51) Int. Cl.
  *B60Q 1/00* (2006.01)
  *G01S 15/931* (2020.01)
(52) U.S. Cl.
  CPC .................. *G01S 15/931* (2013.01)
(58) Field of Classification Search
  CPC ...... G01S 15/931; G01S 7/527; G01S 15/876; B60Q 1/535; B60Q 1/525; B60Q 9/006;
  (Continued)

(56) References Cited

U.S. PATENT DOCUMENTS 4,920,347 A    4/1990  Kurihara
10,866,304 B1 * 12/2020  Hassibi .................. G01S 13/42
(Continued)

FOREIGN PATENT DOCUMENTS

EP    2 690 458 A1    1/2014
JP      2-17484 A     1/1990
(Continued)

OTHER PUBLICATIONS

International Search Report (PCT/ISA/210) issued in PCT/JP2021/016061, dated Jul. 6, 2021.

*Primary Examiner* — Anh V La
(74) *Attorney, Agent, or Firm* — Birch, Stewart, Kolasch & Birch, LLP

(57) ABSTRACT

An object detection apparatus includes a distance calculation unit (125), a position coordinate calculation unit (126), and a noise removal unit (127). The distance calculation unit (125) regards as a target reception signal, each of a plurality of reception signals received by each of a plurality of receivers, detects as a target peak, each of at least one of peaks corresponding to the target reception signals, and calculates as a calculated distance, a distance corresponding to the target peak. The position coordinate calculation unit (126) calculates a detection point indicating position coordinates indicating a position at which an object is estimated to be present, based on each combination of the calculated distance corresponding to each of the plurality of reception signals and each position of the plurality of receivers, and regards as a detection result point group, a set that consists of the calculated detection points. The noise removal unit (127) removes from the detection result point group, a detection point corresponding to noise, based on the position coordinates of each detection point included in the detection result point group.

12 Claims, 19 Drawing Sheets

(58) Field of Classification Search
CPC ...... B60Q 9/007; B60R 21/0134; G08G 1/16;
G08G 1/167; G08G 1/166; G08G 1/165
USPC .......... 367/93; 340/435, 436, 903, 902, 437
See application file for complete search history.

(56) References Cited

U.S. PATENT DOCUMENTS

| | | | |
|---|---|---|---|
| 2011/0205102 A1* | 8/2011 | Shibata | ................ G01S 13/536 342/70 |
| 2014/0022110 A1 | 1/2014 | Itohara et al. | |
| 2020/0249347 A1* | 8/2020 | Suzuki | ................ G01B 21/00 |
| 2020/0400816 A1* | 12/2020 | Sugae | ................ G01S 13/931 |

FOREIGN PATENT DOCUMENTS

| | | |
|---|---|---|
| JP | 2002-245462 A | 8/2002 |
| JP | 2003-57339 A | 2/2003 |
| JP | 2007-212418 A | 8/2007 |
| JP | 2009-145123 A | 7/2009 |
| JP | 2010-107447 A | 5/2010 |
| JP | 2014-132248 A | 7/2014 |
| JP | 2015-114281 A | 6/2015 |
| JP | 2018-40647 A | 3/2018 |
| JP | 2018-96838 A | 6/2018 |
| JP | 2018-167707 A | 11/2018 |
| JP | 2019-185347 A | 10/2019 |
| WO | WO2012/128096 A1 | 9/2012 |

* cited by examiner

OBJECT DETECTION APPARATUS, OBJECT DETECTION METHOD, AND NON-TRANSITORY COMPUTER READABLE-MEDIUM

CROSS REFERENCE TO RELATED APPLICATIONS

This application is a Continuation of PCT International Application No. PCT/JP2021/016061 filed on Apr. 20, 2021, which is hereby expressly incorporated by reference into the present application.

TECHNICAL FIELD

The present disclosure relates to an object detection apparatus, an object detection method, and an object detection program.

BACKGROUND ART

An object detection apparatus is known to detect a surrounding object that is present around a vehicle, using a sensor such as an ultrasonic wave sensor.

As the object detection apparatus, there is an object detection apparatus that includes an ultrasonic wave transmitter and an ultrasonic wave receiver, transmits an ultrasonic wave signal using the ultrasonic wave transmitter, receives a reflected wave that has been reflected back from a surrounding object when there is the surrounding object, detects the surrounding object by checking whether or not there is the reflected wave in a reception signal, and calculates a distance from the vehicle to the surrounding object when the surrounding object has been detected.

Information on the surrounding object detected by the object detection apparatus is used such as to issue a report or a warning to a driver of the vehicle, or to control the vehicle so as to avoid the vehicle from colliding with the object.

Further, as the object detection apparatus, there is an object detection apparatus that calculates relative position coordinates and a direction at which the surrounding object is present, and relative speed or the like of the surrounding object, using a plurality of ultrasonic wave sensors.

As a specific example, the object detection apparatus detects the surrounding object using one ultrasonic wave transmitter and two ultrasonic wave receivers at known arrangements, and by calculating a distance from each ultrasonic wave receiver to the detected surrounding object, the object detection apparatus is able to calculate the relative position coordinates of the surrounding object based on the principle of trilateration, triangulation, or the like. The ultrasonic wave transmitter and the ultrasonic wave receiver may be the same sensor, or different sensors from each other. Further, the number of each of ultrasonic wave transmitters and ultrasonic wave receivers may be equal to or greater than two pieces. Hereinafter, for convenience of explanation, a case will be described where the object detection apparatus uses one ultrasonic wave transmitter and two ultrasonic wave receivers.

Here, a detection result of the object detection apparatus generally include noise. The noise occurs in a case such that a reflected wave from an object is erroneously detected, the object being not subject to detection of such as the reflected wave from the road surface, that the reflected wave from the object cannot be normally detected since backboard noise is large, or that sidelobes that appear on the left and right of a true reflected wave peak are erroneously detected.

Further, a case is considered where a plurality of reflected waves for one reception signal are detected, for the purpose of detecting a plurality of surrounding objects. Generally, since the number of surrounding objects to be detected is unknown, the number of reflected waves to be detected is also unknown. However, if the object detection apparatus detects a certain amount and a plenty of reflected waves, detection results include not only information corresponding to the reflected waves from detection targets, but also noise.

At this time, when relative position coordinates are calculated based on the principle of trilateration using a plurality of sensors, the trilateration is used by combining a plurality of distances calculated based on the detection result of each sensor. Therefore, if a combination of distance information is erroneous, erroneous relative position coordinates are calculated, where the combination is such as a combination of noise and a distance to a detection target, a combination of noise and noise, or a combination of a distance to a detection target A and a distance to a detection target B.

As a method of removing or reducing noise, as a specific example, a method is known, such as a method of removing a result outside an observation range of a sensor, using a known viewing angle, a known distance measuring range, or the like of the sensor, or a method of excluding an outlier value by treating detection results from past to present as time-series data.

Patent Literature 1 discloses a technique of removing noise, while estimating the shape of a road from detection points, by grouping the detection points from past to present and excluding a group that includes a small number of detection points.

CITATION LIST

Patent Literature

Patent Literature 1: JP 2010-107447 A

SUMMARY OF INVENTION

Technical Problem

In the technique disclosed in Patent Literature 1, it is assumed to use a radar that is able to detect more points at once than an ultrasonic wave sensor. Generally, the radar uses a method of calculating an angle from directivity of each reception antenna, where a large number of reception antennas are arranged in an array, and the principle of this method differs from the principle of the method of calculating the relative position coordinates based on the trilateration using the ultrasonic wave sensor. Therefore, properties of detection results obtained by the method using the radar and the method using the ultrasonic wave sensor differ from each other.

Specifically, when a plurality of reflected wave peaks are detected from the reception signal acquired by the ultrasonic wave receiver and the trilateration is used by combining the detection results of each ultrasonic wave receiver, detection points which are the detection results of the relative position coordinates tend to appear in a circular arc shape, caused by erroneously combining noise slightly shifted from a peak corresponding to the reflected wave from the detection target.

Therefore, even if the technique disclosed in Patent Literature 1 is applied to remove detection points corresponding to noise, from the detection points obtained from a plurality of ultrasonic wave sensors, there is a problem that it is not possible to appropriately remove the detection points corresponding to noise in consideration of properties of the ultrasonic wave sensor and properties of the trilateration.

The present disclosure aims to remove detection points corresponding to noise from detection points obtained from a plurality of ultrasonic wave sensors in consideration of properties of the ultrasonic wave sensor and properties of trilateration.

Solution to Problem

An object detection apparatus according to the present disclosure includes:
- a distance calculation unit to regard as a target reception signal, each of a plurality of reception signals which is a signal received by each of a plurality of receivers and is a signal corresponding to a transmission signal which is a signal transmitted by a transmitter and reflected by an object, to detect as a target peak, each of at least one of peaks corresponding to the target reception signals, and to calculate as a calculated distance, a distance corresponding to the target peak;
- a position coordinate calculation unit to calculate a detection point indicating position coordinates indicating a position at which the object is estimated to be present, based on each combination of the calculated distance corresponding to each of the plurality of reception signals, a position of the transmitter, and each position of the plurality of receivers, and to regard as a detection result point group, a set that consists of the calculated detection points; and
- a noise removal unit to remove from the detection result point group, a detection point corresponding to noise, based on the position coordinates of each detection point included in the detection result point group.

Advantageous Effects of Invention

According to the present disclosure, a noise removal unit removes detection points corresponding to noise from a detection result point group, based on position coordinates of each detection point included in the detection result point group. Here, when each of a transmitter and a plurality of receivers is an ultrasonic wave sensor, and a position coordinate calculation unit calculates based on trilateration, the position coordinates of each detection point included in the detection result point group, properties of the ultrasonic wave sensor and properties of the trilateration are reflected in the position coordinates of each detection point included in the detection result point group. Therefore, according to the present disclosure, it is possible to remove the detection points corresponding to noise from detection points obtained from a plurality of ultrasonic wave sensors in consideration of the properties of the ultrasonic wave sensor and the properties of the trilateration.

DESCRIPTION OF EMBODIMENTS

Figure 1:
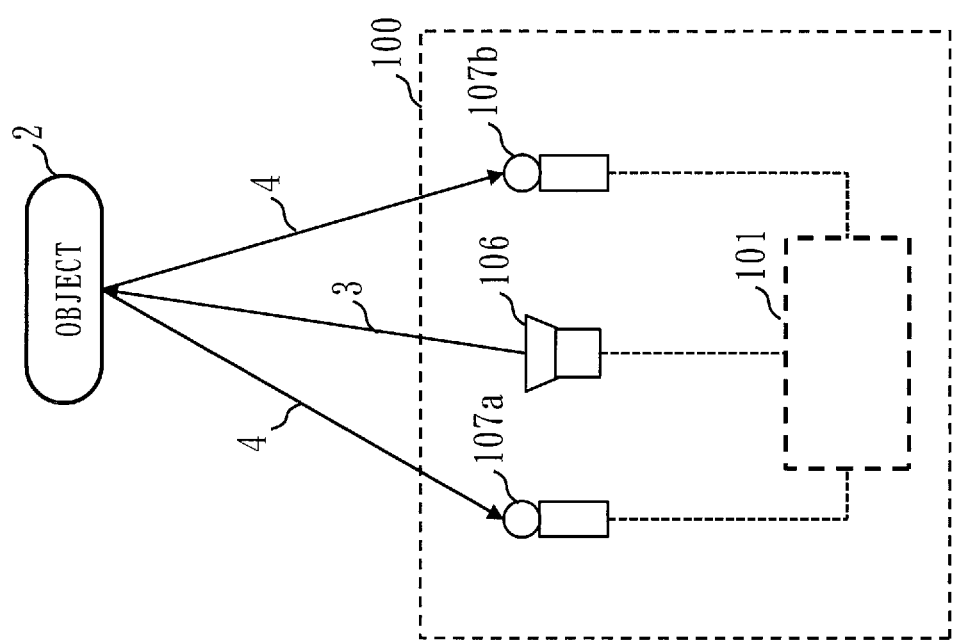
FIG. 1 is a diagram illustrating an application example of an object detection apparatus 100 according to Embodiment 1.

In the description and drawings of embodiments, the same elements and corresponding elements are denoted by the same reference sign. The description of elements denoted by the same reference sign will be suitably omitted or simplified. Arrows in the drawings mainly indicate flows of data or flows of processing. Further, "unit" may be suitably interpreted as "circuit", "step". "procedure". "process", or "circuitry".

Embodiment 1

The present embodiment will be described in detail below with reference to the drawings.

Description of Configuration

FIG. 1 illustrates an application example of an object detection apparatus 100 according to the present embodiment.

The object detection apparatus 100 includes an ultrasonic wave transmitter 106 and two ultrasonic wave receivers 107, and a control device 101 that controls these. The ultrasonic wave receiver 107 is a general term for an ultrasonic wave receiver included in the object detection apparatus 100. The object detection apparatus 100 is mounted on, as a specific example, a four-wheeled vehicle. An installation target of the object detection apparatus 100 is not limited to the four-wheeled vehicle, but may be another moving body such as a two-wheeled vehicle, a ship, a Personal Mobility Vehicle (PMV), or an Autonomous Mobile Robot (AMR), or may be a stationary body such as a wall or a ceiling of a building.

For convenience of explanation, a case will be described below where the object detection apparatus 100 is mounted on a vehicle 1 which is not illustrated. As a specific example, each of the ultrasonic wave transmitter 106, the ultrasonic wave receiver 107a, and the ultrasonic wave receiver 107b is installed on the outer surface of the vehicle 1, and the control device 101 is installed inside the vehicle 1.

The control device 101 causes the ultrasonic wave transmitter 106 to transmit a reference wave used for detecting an object 2, as a transmission wave 3. Each of the ultrasonic wave receiver 107a and the ultrasonic wave receiver 107b receives reference waves. The reference wave is, as a specific example, an ultrasonic wave. Here, a reference wave received by each of the ultrasonic wave receiver 107a and the ultrasonic wave receiver 107b that directly reaches each of the ultrasonic wave receiver 107a and the ultrasonic wave receiver 107b without being reflected by the object 2, is referred to as a direct wave 5. A reference wave received by each of the ultrasonic wave receiver 107a and the ultrasonic wave receiver 107b that is reflected by the object 2 and is other than the direct wave 5, is referred to as a reflected wave 4. The object 2 is an object that is present around the vehicle 1.

As illustrated in FIG. 1, when the object 2 is present around the vehicle 1, the transmission wave 3 is reflected by the object 2 and returns to the vehicle 1 as the reflected wave 4. The object detection apparatus 100 detects the object 2 using the reflected wave 4 received by each of the ultrasonic wave receiver 107a and the ultrasonic wave receiver 107b. Here, when the vehicle 1 receives an erroneous result from the object detection apparatus 100, the vehicle 1 may erroneously perform warning, control, or the like.

An arrangement of each of the ultrasonic wave transmitter 106, the ultrasonic wave receiver 107a, and the ultrasonic wave receiver 107b is not limited to the position illustrated in the drawing. Each of the ultrasonic wave receiver 107a and the ultrasonic wave receiver 107b may be arranged in an area where the reflected wave 4 can be received, and may be arranged at, as a specific example, front, back, side, front side, back side, top, or bottom of the vehicle 1. However, in order to calculate coordinates of the object 2 using trilateration, it is preferable that a distance from the ultrasonic wave transmitter 106 to the ultrasonic wave receiver 107a and a distance from the ultrasonic wave transmitter 106 to the ultrasonic wave receiver 107b, differ from each other.

Figure 2:
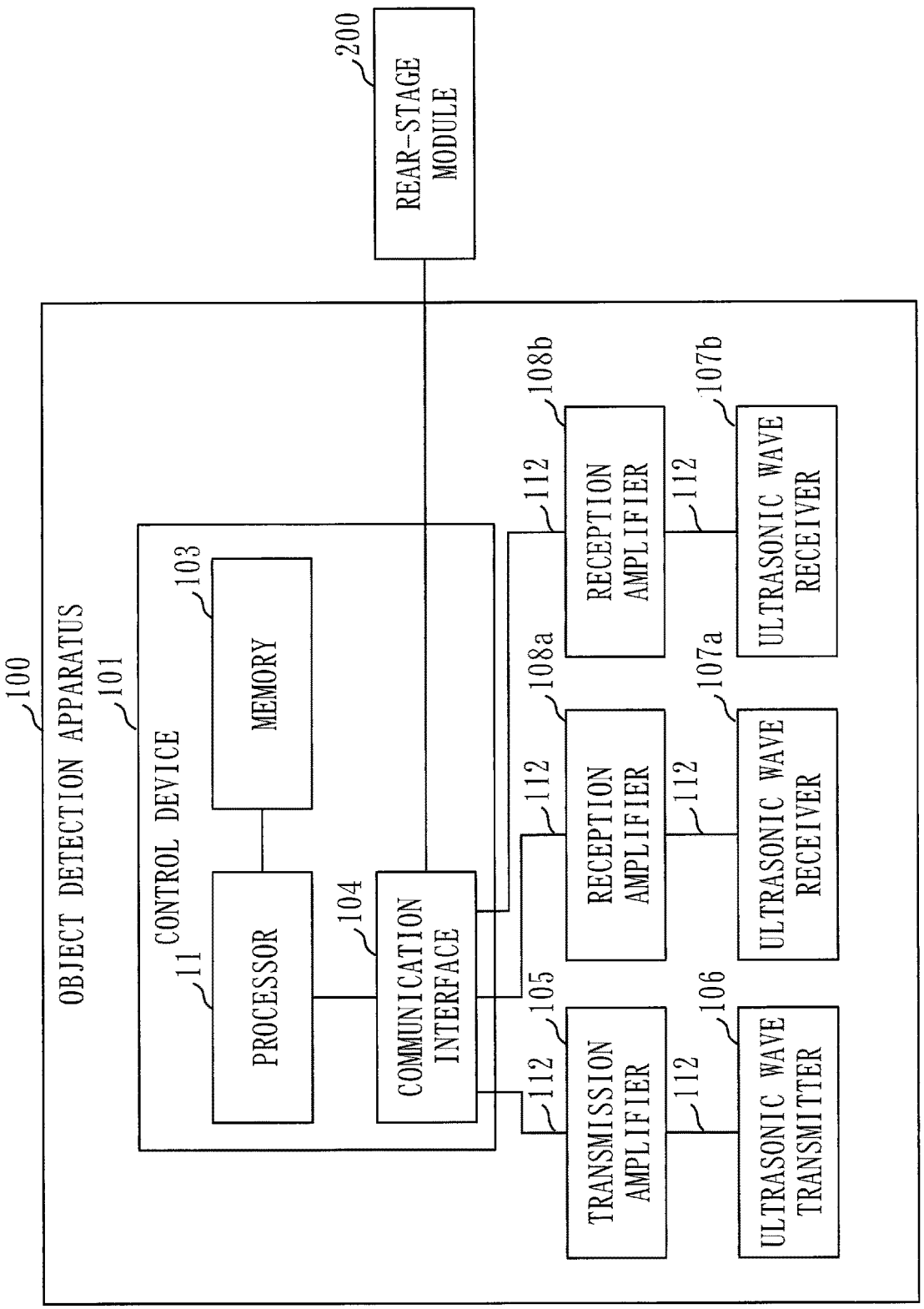
FIG. 2 is a diagram illustrating a hardware configuration example of the object detection apparatus 100 according to Embodiment 1.

FIG. 2 illustrates a hardware configuration example of the object detection apparatus 100 according to the present embodiment.

The object detection apparatus 100 may be implemented in a form integrated with or a form that cannot be separated from, the vehicle 1, or each component or the like illustrated in this drawing. Alternatively, the object detection apparatus 100 may be implemented in a form that can be removed or separated from the vehicle 1 or each component or the like illustrated in this drawing.

As illustrated in FIG. 2, the object detection apparatus 100 includes the control device 101, a transmission amplifier 105, the ultrasonic wave transmitter 106, the ultrasonic wave receiver 107a, the ultrasonic wave receiver 107b, a reception amplifier 108a, a reception amplifier 108b, and signal lines 112.

In FIG. 2, in order to simplify description, the object detection apparatus 100 is assumed to include as many reception amplifiers 108 as the ultrasonic wave receivers 107. However, the reception amplifier 108a and the reception amplifier 108b may be configured as one reception amplifier, and the one reception amplifier may be configured to receive signals from a plurality of ultrasonic wave receivers 107.

The control device 101 is connected via the signal lines 112, to each of the transmission amplifier 105, the reception amplifier 108a, and the reception amplifier 108b. As illustrated in this drawing, the control device 101 is a general computer. The control device 101 may consist of a plurality of computers.

Each of the transmission amplifier 105 and the ultrasonic wave transmitter 106, the reception amplifier 108a and the ultrasonic wave receiver 107a, and the reception amplifier 108b and the ultrasonic wave receiver 107b, are connected with each other via the signal line 112.

The control device 101 is an Electronic Control Unit (ECU), and includes a processor 11, a memory 103, and a communication interface 104.

The control device 101 transmits an acoustic signal for causing the ultrasonic wave transmitter 106 to transmit an ultrasonic wave, and performs an object detection process using the acoustic signal received by each of the ultrasonic wave receiver 107a and the ultrasonic wave receiver 107b.

Hereinafter, an acoustic signal transmitted by the ultrasonic wave transmitter 106 is referred to as a transmission signal, and an acoustic signal received by each of the ultrasonic wave receiver 107a and the ultrasonic wave receiver 107b is referred to as a reception signal. The reception signal may refer to a reception signal amplified by each of the reception amplifier 108a and the reception amplifier 108b.

The processor 11 is a processing device that reads programs and the like stored in the memory 103 and executes the programs. The processing device is sometimes referred to as an Integrated Circuit (IC). The processor 11 is, as a specific example, a Central Processing Unit (CPU).

The control device 101 may include a plurality of processors as an alternative to the processor 11. The plurality of processors share the role of the processor 11.

The memory 103 is configured with a main storage device 12 (not illustrated) that stores temporary data and the like used when the processor 11 executes a program, and an auxiliary storage device 13 (not illustrated) that stores the programs to be executed by the processor 11, various kinds of parameters such as threshold values, and the like.

The main storage device 12 stores reception signals temporarily. The main storage device 12 is, as a specific example, a Random Access Memory (RAM).

The auxiliary storage device 13 stores an object detection program, an Operating System (OS) 19 (not illustrated), and the like, and may be, as a specific example, a Hard Disk Drive (HDD) or a Read Only Memory (ROM). The auxiliary storage device 13 may be a computer readable portable recording medium such as a NAND flash memory or the like. The object detection program may be provided as a program product.

Each function of the main storage device 12 and the auxiliary storage device 13 may be implemented by another storage mean.

The communication interface 104 transmits a transmission signal generated by the processor 11 to the transmission amplifier 105, and receives a reception signal from each of the reception amplifier 108a and the reception amplifier 108b.

The communication interface 104 incorporates an analog-to-digital converter and a digital-to-analog converter, and converts the transmission signal from a digital signal to an analog signal and converts the reception signal from an analog signal to a digital signal.

The communication interface 104 may consist of one interface that transmits and receives a plurality of types of signals, or may consist of a plurality of interfaces each of which has a required individual function.

The communication interface 104 may include an input/output interface such as a Universal Serial Bus (USB) terminal, or the like, or may include a communication chip, a Network Interface Card (NIC), or the like.

Other components of the object detection apparatus 100 will be described.

The transmission amplifier 105 is connected to the control device 101 via the signal line 112, and connected to the ultrasonic wave transmitter 106 via the signal line 112. The transmission amplifier 105 amplifies the acoustic signal transmitted from the control device 101, and transmits the amplified acoustic signal to the ultrasonic wave transmitter 106.

The ultrasonic wave transmitter 106 transmits to the outside, an acoustic signal based on the signal received from the transmission amplifier 105.

The ultrasonic wave receiver 107a and the ultrasonic wave receiver 107b are connected to the reception amplifier 108a and the reception amplifier 108b, respectively, via the signal line 112, and receive the acoustic signal.

Each of the reception amplifier 108a and the reception amplifier 108b is connected to the control device 101 via the signal line 112, amplifies the acoustic signal received from each of the ultrasonic wave receiver 107a and the ultrasonic wave receiver 107b, and transmits the amplified acoustic signal to the control device 101.

The ultrasonic wave transmitter 106 and the transmission amplifier 105 may be implemented in an integrated form or a form that cannot be separated, or may be implemented in a form that can be removed or separated.

Similarly, each of the ultrasonic wave receiver 107a and the ultrasonic wave receiver 107b, and the reception amplifier 108a and the reception amplifier 108b may be implemented in an integrated form or in a form that cannot be separated, or may be implemented in a form that can be removed or separated.

Further, in FIG. 2, the transmission amplifier 105, the ultrasonic wave transmitter 106, the ultrasonic wave receiver 107a, the ultrasonic wave receiver 107b, the reception amplifier 108a, and the reception amplifier 108b are pieces of hardware that differ from each other, but at least a part of these pieces of hardware may be the same hardware. That is, as a specific example, the transmission amplifier 105 and the ultrasonic wave transmitter 106 may be a transmission ultrasonic wave sensor with built-in amplifier. Each of the ultrasonic wave receiver 107a and the reception amplifier 108a, and the ultrasonic wave receiver 107b and the reception amplifier 108b may be a reception ultrasonic wave sensor with built-in amplifier. The ultrasonic wave sensors used for these pieces of hardware may be ultrasonic wave sensors that differ from each other, or may be one ultrasonic wave sensor having both a transmission function and a reception function.

The signal line 112 is a communication line that connects a device such as an ultrasonic wave sensor. A signal for communication between devices is transmitted and received via the signal line 112.

Figure 3:
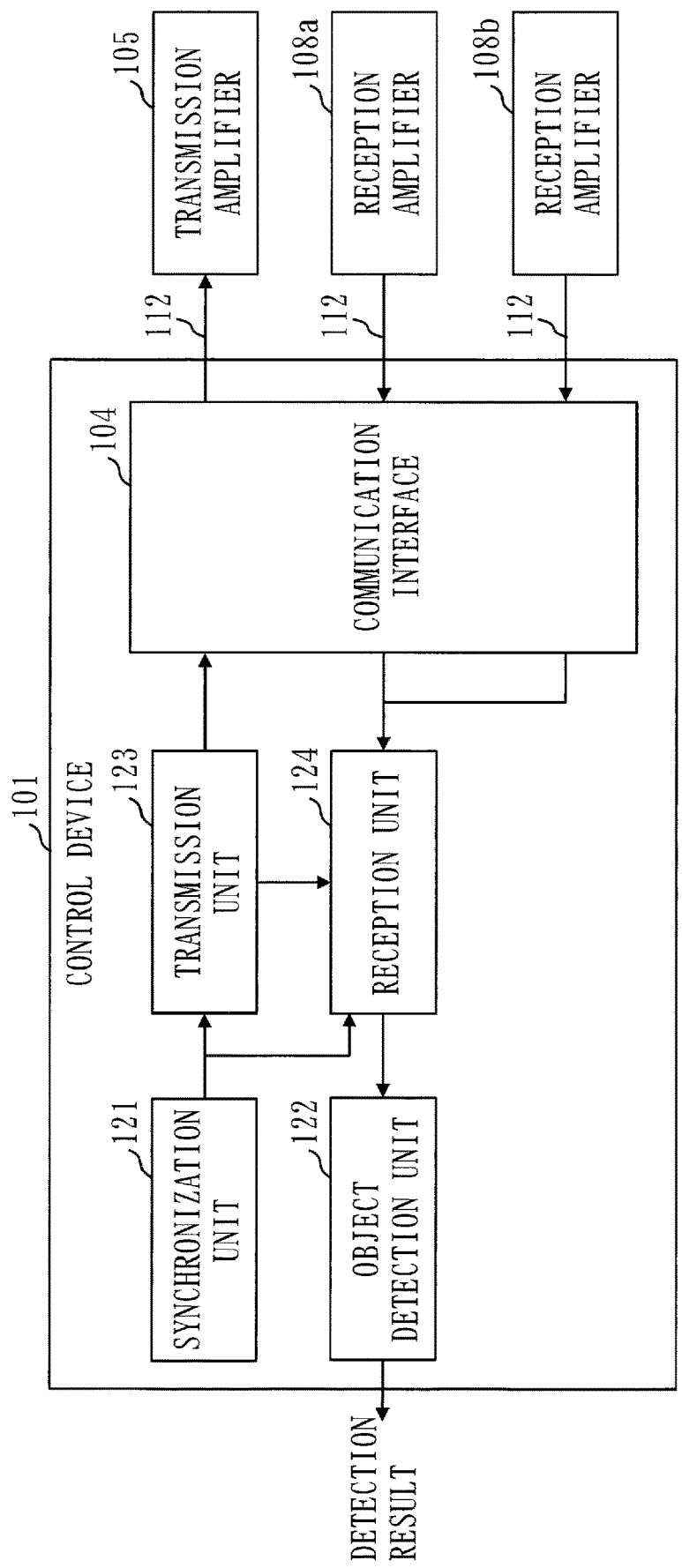
FIG. 3 is a functional block diagram of a control device 101 according to Embodiment 1.

FIG. 3 illustrates a specific example of a functional block diagram of the control device 101. A configuration of the control device 101 will be described with reference to this drawing.

As illustrated in this drawing, the control device 101 includes the communication interface 104, a synchronization unit 121, an object detection unit 122, a transmission unit 123, and a reception unit 124, and connected to the transmission amplifier 105, the reception amplifier 108a, and the reception amplifier 108b.

Functions of the individual functional components of the synchronization unit 121, the object detection unit 122, the transmission unit 123, and the reception unit 124 are implemented by the processor 11 executing a program for processing the function of each unit.

The transmission unit 123 transmits a transmission signal to the transmission amplifier 105 via the communication interface 104.

The reception unit 124 receives a reference signal from the transmission unit 123, and transmits to the object detection unit 122, the received reference signal and a reception signal transmitted from each of the reception amplifier 108a and the reception amplifier 108b via the communication interface 104.

The reception unit 124 may hold the reference signal in the memory 103 in advance, and transmit the reference signal to the object detection unit 122 while the object detection unit 122 performs the object detection process. The reception unit 124 may hold in the memory 103, waveform data of the reference signal in place of the reference signal, and transmit to the object detection unit 122, the waveform data of the reference signal in place of the reference signal.

The synchronization unit 121 has a function of synchronizing time axes of the transmission unit 123 and the reception unit 124, and makes a transmission start time and a storage start time the same. The transmission start time is a time when the transmission unit 123 has started transmitting the transmission signal. The storage start time is a time when the reception unit 124 has started storing the reception signal.

The synchronization unit 121 synchronizes a time when the moving body has transmitted the transmission signal with a time when the reception unit 124 starts storing the reception signal. The time when the moving body has transmitted the transmission signal is a time when the ultrasonic wave transmitter 106 has transmitted the transmission signal.

The object detection unit 122 detects the object 2 using the transmitted reception signal, and outputs information indicating a detection result.

The reception unit 124 may accumulate the reception signal in the memory 103, and transmit the reception signal to the object detection unit 122 after accumulating the reception signal for a predetermined period of time. The predetermined time is, as a specific example, a periodical time. The periodical time is a time from a time point when transmission of a transmission signal has started, to a time point when the next transmission signal is transmitted. The reception unit 124 may change the predetermined time as necessary. Alternatively, the reception unit 124 may sequentially transmit the reception signal to the object detection unit 122, and the object detection unit 122 may sequentially perform the object detection process using the reception signal sequentially transmitted.

Further, the reception unit 124 may appropriately process the reception signal to make it easy for the object detection unit 122 to perform processing, and transmit the processed reception signal to the object detection unit 122.

The reception unit 124 stores a reception signal that includes information corresponding to a time point when a transmission signal has been transmitted, the transmission signal being corresponded to a reference signal and transmitted from the moving body. The information corresponding to the time point when the transmission signal transmitted from the moving body has been transmitted is, as a specific example, a signal corresponding to the direct wave 5 included in the reception signal.

Figure 4:
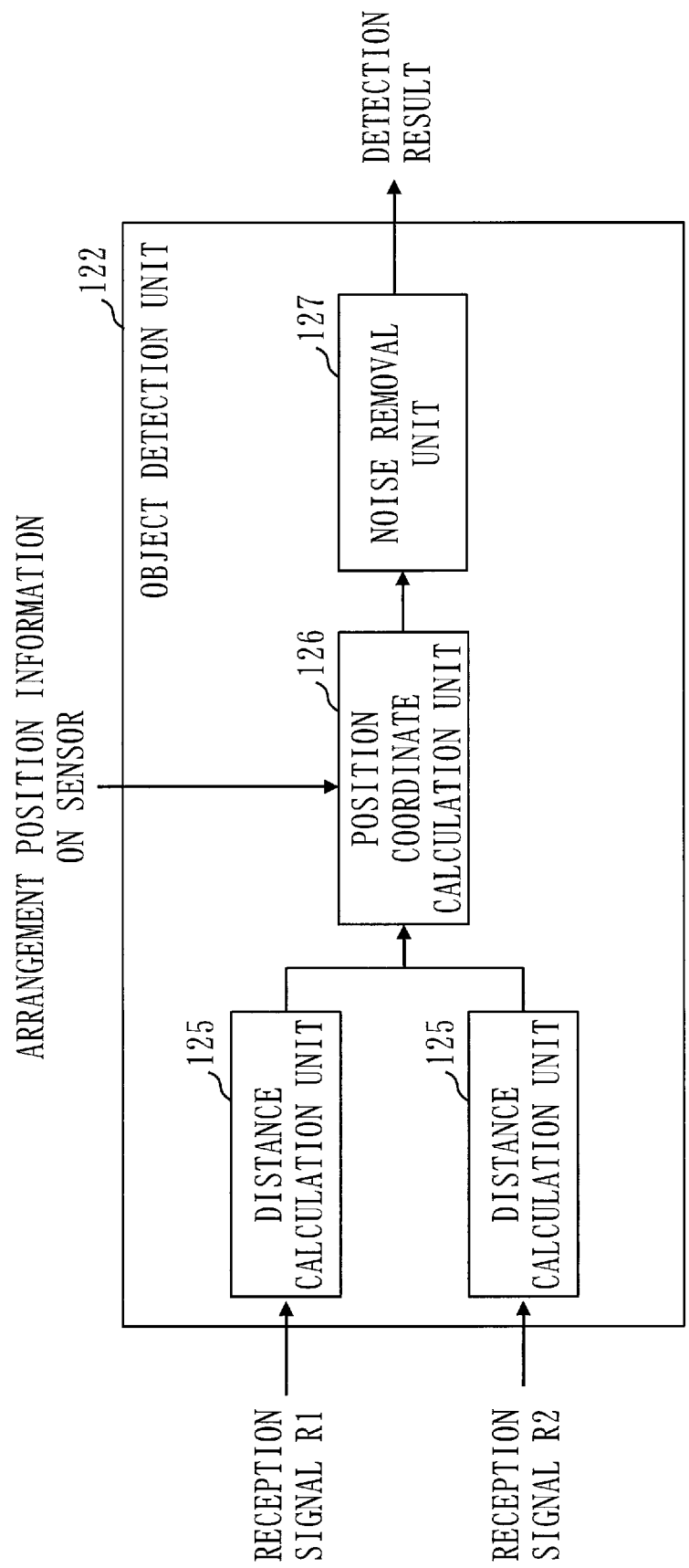
FIG. 4 is a functional block diagram of an object detection unit 122 according to Embodiment 1.

FIG. 4 illustrates a specific example of a functional block diagram of the object detection unit 122. A configuration of the object detection unit 122 will be described with reference to this drawing. A reception signal R1 is a reception signal from the reception amplifier 108a, and a reception signal R2 is a reception signal from the reception amplifier 108b.

As illustrated in this drawing, the object detection unit 122 includes a distance calculation unit 125, a position coordinate calculation unit 126, and a noise removal unit 127.

The distance calculation unit 125 detects peak candidates of a correlation waveform by analyzing a correlation between the reference signal and the reception signal corresponding to each of the ultrasonic wave receiver 107a and the ultrasonic wave receiver 107b, and calculates a distance from the vehicle 1 to the object 2 corresponding to each detected peak candidate. Here, the object 2 may also refer to a virtual object. The distance calculation unit 125 regards as a target reception signal, each of a plurality of reception signals, detects as a target peak, each of at least one of peaks corresponding to the target reception signals, and calculates as a calculated distance, a distance corresponding to the target peak. The plurality of reception signals are signals transmitted by a transmitter and corresponding to transmission signals which are signals reflected by the object 2, and are signals received by each of the plurality of receivers. The transmitter is, as a specific example, the ultrasonic wave transmitter 106. The receiver is, as a specific example, the ultrasonic wave receiver 107.

The distance calculation unit 125 may analyze the correlation using the transmission signal in place of the reference signal, or may detect the peak candidates from the reception signal without analyzing the correlation.

The distance calculation unit 125 generates a distance set that consists of the calculated distances and that corresponds to each of the ultrasonic wave receiver 107a and the ultrasonic wave receiver 107b, and transmits the generated distance set to the position coordinate calculation unit 126.

The distance calculation unit 125 selects from among peaks that appear in a cross-correlation function based on the reception signal and the reference signal, a peak that does not correspond to the direct wave 5, as a peak candidate. When not analyzing the correlation, the distance calculation unit 125 uses the reception signal itself in place of the cross-correlation function. The distance calculation unit 125 calculates as a calculated distance, a value obtained by converting into a distance, the relative position of each peak with respect to the position of the peak corresponding to the transmission signal.

Specifically, a value obtained by multiplying a time required from transmitting the transmission signal until the peak appears, by the speed of sound, is equivalent to a path length which is the sum of a distance from the ultrasonic wave transmitter 106 to the object 2 and a distance from the object 2 to the ultrasonic wave receiver 107a or the ultrasonic wave receiver 107b. This path length is referred to as the calculated distance.

The position coordinate calculation unit 126 calculates relative position coordinates from the vehicle 1 to the object 2, based on the principle of trilateration, using the distance set corresponding to each of the two reception signals, and arrangement position information on the ultrasonic wave transmitter 106, the ultrasonic wave receiver 107a, and the ultrasonic wave receiver 107b. The position coordinate calculation unit 126 calculates a detection point based on each combination of the calculated distance corresponding to each of the plurality of reception signals, the position of the transmitter, and each position of the plurality of receivers, and regards a set that consists of the calculated detection points, as a detection result point group. The detection point indicates the position coordinates indicating a position at which the object 2 is estimated to be present. The detection point may simply be expressed as a point.

Here, when the distance set includes a plurality of distance values, the position coordinate calculation unit 126 calculates the relative position coordinates corresponding to each of total combinations of each distance value included in the distance set. That is, as a specific example, when the distance set corresponding to the ultrasonic wave receiver 107a is expressed by [Formula 1], and the distance set corresponding to the ultrasonic wave receiver 107b is expressed by [Formula 2], the position coordinate calculation unit 126 calculates the relative position coordinates for all combinations of $d_{ai}$ and $d_{bj}$.

After that, the position coordinate calculation unit 126 regards as the detection result point group, collected points of the calculated relative position coordinates from which points positioned outside the range of the sensor viewing angle have been excluded, and transmits the detection result point group to the noise removal unit 127. The position coordinate calculation unit 126 may remove the relative position coordinates that are considered to be abnormal values. Each relative position coordinate included in the detection result point group is also the detection point.

$$D_a = \{d_{ai}\}_{i=0}^{N_a} \qquad \text{[Formula 1]}$$

$$D_b = \{d_{bi}\}_{i=0}^{N_b} \qquad \text{[Formula 2]}$$

The above-described process up to obtaining the detection result point group from the reception signal, is an example, and the object detection apparatus 100 may obtain the detection result point group using another process. Further, the object detection apparatus 100 may obtain the distance values and the relative position coordinates, using various methods that can be considered by a person skilled in the art.

As a specific example, using a commercially available ultrasonic wave sensor, the object detection apparatus 100 may calculate the position coordinates based on the trilateration using the distance values output from the sensor. Here, internal processing for obtaining a distance value may be any processing. With respect to the distance value, it is generally assumed that a distance from the ultrasonic wave transmitter 106 to the object 2 and a distance from the object 2 to the ultrasonic wave receiver 107a or the ultrasonic wave receiver 107b are approximately equal, and in many cases, a value obtained by dividing by 2, a path length obtained by detecting a peak candidate, as the distance value.

The noise removal unit 127 removes noise from the detection result point group, and transmits to a rear-stage module 200 which is not illustrated, information indicating the detection result point group from which the noise has been removed, as the detection result. The noise removal unit 127 removes from the detection result point group, the detection points corresponding to noise, based on the position coordinates of each detection point included in the detection result point group. The noise is a detection point which is not the detection point obtained by appropriately combining the distance values. The noise removal unit 127 may remove from the detection result point group, the detection points corresponding to noise, based on the position coordinates of each detection point whose coordinate system has been converted into a coordinate system suitable for representing a convex curved surface. The noise removal unit 127 may divide into a plurality of regions, a region that includes the detection points included in the detection result point group, select from among the plurality of regions, a region that includes the largest number of detection points, calculate a valid point based on the position coordinates of each detection point included in the selected region, and by regarding as noise, a detection point that is not the calculated valid point, remove from the detection result point group, the detection point corresponding to noise. The valid point is a point indicating the position coordinates at which the object 2 is estimated to be actually present. The noise removal unit 127 may decide whether or not a point is the valid point, in response to a property of a reception signal corresponding to each detection point included in the selected region.

The rear-stage module 200 is, as a specific example, a vehicle control ECU, an alarm device ECU, or the like.

Figure 5:
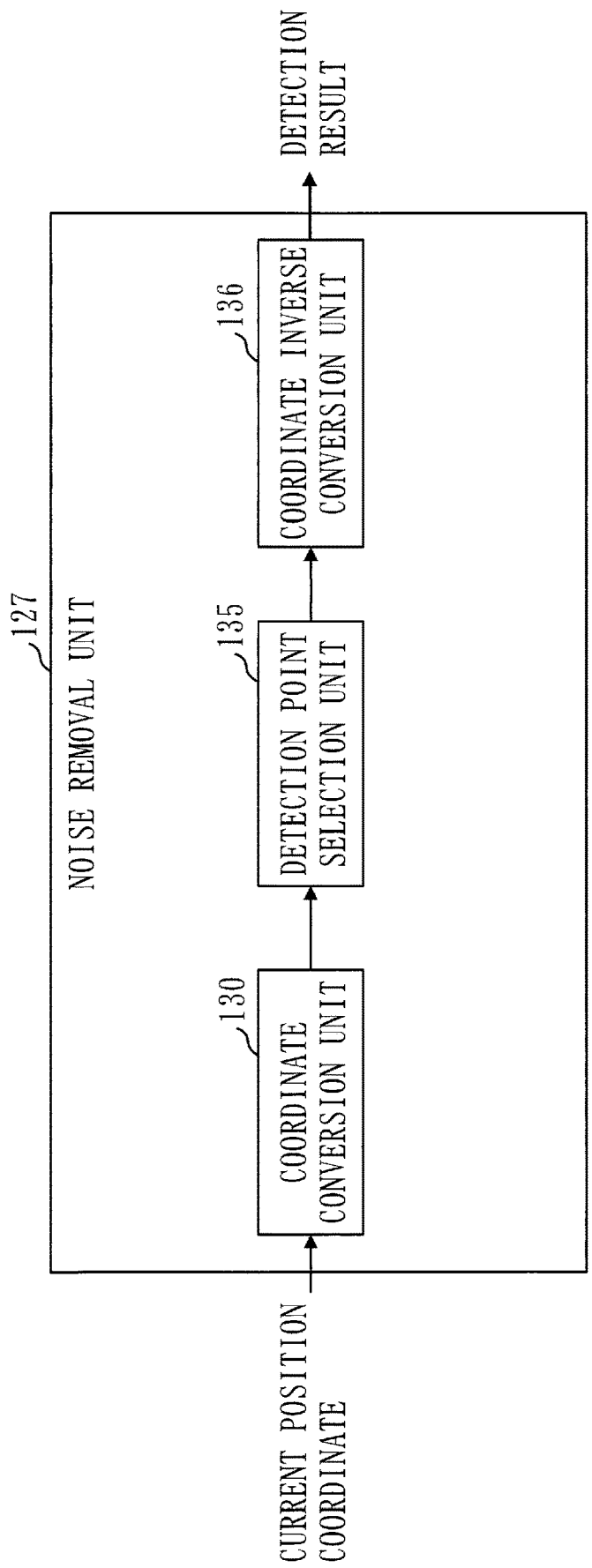
FIG. 5 is a functional block diagram of a noise removal unit 127 according to Embodiment 1.

FIG. 5 illustrates a specific example of a functional block diagram of the noise removal unit 127. A configuration of the noise removal unit 127 will be described with reference to this drawing.

As illustrated in this drawing, the noise removal unit 127 includes a coordinate conversion unit 130, a detection point selection unit 135, and a coordinate inverse conversion unit 136.

The coordinate conversion unit 130 performs coordinate conversion and normalization on each point in the detection result point group transmitted from the position coordinate calculation unit 126, and transmits its result to the detection point selection unit 135. The coordinate conversion unit 130 converts the coordinate system of the position coordinates of each detection point included in the detection result point group, into a coordinate system suitable for representing a convex curved surface. This coordinate system is, as a specific example, a polar coordinate system. Details of processing of the coordinate conversion unit 130 will be described below.

The detection point selection unit 135 removes noise from the detection result point group transmitted from the coordinate conversion unit 130 and calculates a valid point, and transmits the calculated valid point to the coordinate inverse conversion unit 136. Details of processing of the detection point selection unit 135 will be described below.

The coordinate inverse conversion unit 136 returns the coordinate system of the valid point back to the original coordinate system, by performing inverse conversion of the coordinate conversion and the normalization performed by the coordinate conversion unit 130 on the valid point transmitted from the detection point selection unit 135. The coordinate inverse conversion unit 136 transmits to the rear-stage module 200 which is not illustrated, a result of returning to the coordinate system, as a final detection result.

Here, the coordinate inverse conversion unit 136 may store a conversion formula used by the coordinate conversion unit 130 for the conversion, and perform the inverse conversion according to an inverse conversion formula corresponding to the stored conversion formula. The coordinate inverse conversion unit 136 may obtain coordinates corresponding to the original coordinate system by holding the detection result point group transmitted from the position coordinate calculation unit 126, assigning an index number in advance to each point included in the detection result point group, referring to an index corresponding to the valid point calculated by the detection point selection unit 135, and extracting a point corresponding to the index from the held detection result point group. The coordinate inverse conversion unit 136 may obtain coordinates of the valid point calculated by the detection point selection unit 135, where the coordinates are corresponded to the original coordinate system, using various methods that can be considered by a person skilled in the art.

Description of Operation

An operation procedure of the object detection apparatus 100 is equivalent to an object detection method. Further, a program that implements operation of the object detection apparatus 100 is equivalent to an object detection program.

Figure 6:
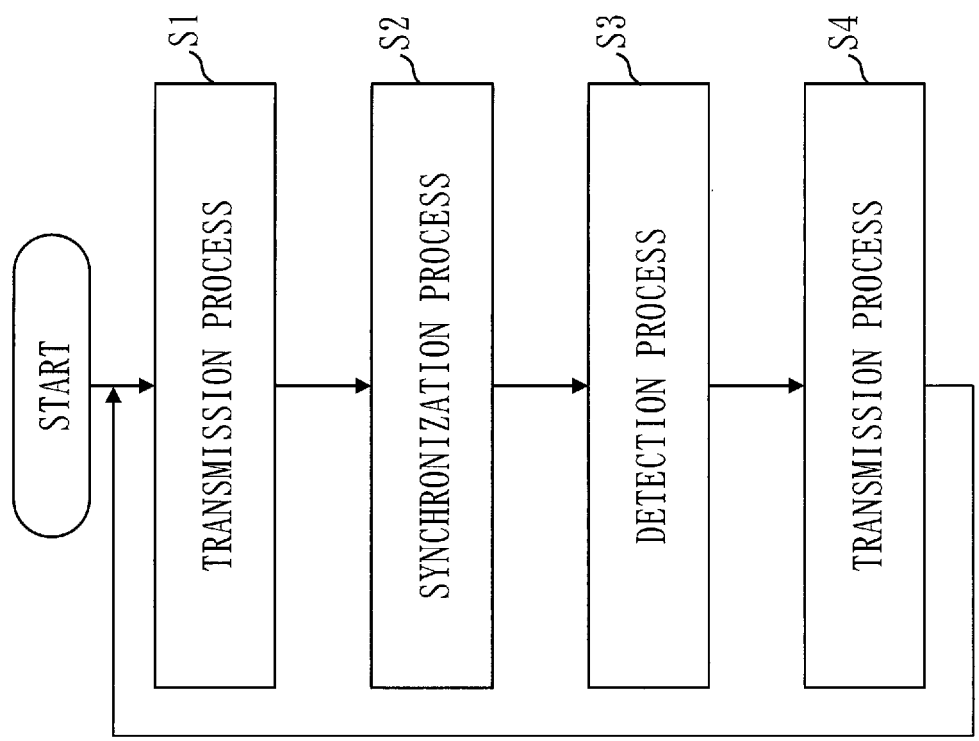
FIG. 6 is a flowchart illustrating operation of the control device 101 according to Embodiment 1.

FIG. 6 is a flowchart illustrating an example of the operation of the object detection apparatus 100. The operation of the object detection apparatus 100 will be described with reference to this drawing.

(Step S1: Transmission Process)

The transmission unit 123 causes the ultrasonic wave transmitter 106 to transmit a transmission signal. The transmission signal is a pair pulse wave, a tone burst wave, a chirp wave, or the like, and the type of the transmission signal is not particularly limited.

(Step S2: Synchronization Process)

The synchronization unit 121 synchronizes the transmission start time with the storage start time. The transmission start time is also a time when the transmission unit 123 has started the process of step S1.

In order to perform the process of this step, the synchronization unit 121 may read a waveform of the transmission signal stored in the memory 103, or acquire the waveform of the transmission signal sequentially created by the transmission unit 123.

After processing of the synchronization unit 121 is completed, the reception unit 124 receives as the reception signal, a signal received by each of the ultrasonic wave receiver 107a and the ultrasonic wave receiver 107b, and transmits the received reception signal to the object detection unit 122.

Further, the reception unit 124 receives the reference signal from the transmission unit 123, and transmits the received reference signal to the object detection unit 122.

(Step S3: Detection Process)

The object detection unit 122 performs the detection process using the reception signal. Details of the process of this step will be described below.

(Step S4: Transmission Process)

The object detection unit 122 transmits to rear-stage module 200, the relative position coordinates from the vehicle 1 to the object 2 calculated in step S3, as the detection result.

Since there may be a plurality of objects 2 around the vehicle 1, the position coordinate being the detection result is not limited to one point, and may consist of a plurality of points.

Further, when the number of valid points calculated in step S203 is 0, that is, when there is no detection point that satisfies criteria, the object detection unit 122 may determine that there is no detection point corresponding to the reflected wave 4. In this case, the object detection unit 122 may transmit to the rear-stage module 200, information indicating such that the object 2 has not been detected, or a distance or position coordinates are invalid values.

The object detection apparatus 100 repeatedly performs the processes indicated in this flowchart at transmission intervals. The transmission interval is, as a specific example, the periodical time.

The object detection apparatus 100 may change the transmission interval according to the situation of the vehicle 1, instead of continuing to always perform the processes of this flowchart at equal intervals. The object detection apparatus 100 may change the transmission interval according to the speed of the vehicle 1 during, as a specific example, stopping, travelling at low speed, travelling at high speed, or the like.

As another specific example, the object detection apparatus 100 may change the transmission interval according to the situation of the surrounding of the vehicle 1 such that the transmission interval is shortened in a case where it is required to detect the object 2 at short intervals and the transmission interval is lengthened in other cases.

The object detection apparatus 100 may change the interval according to a sensing area. As a specific example, the object detection apparatus 100 lengthens the transmission interval when sensing the object 2 positioned at a long distance. This is because it is necessary to prevent the object detection apparatus 100 from being unable to associate the reflected wave 4 with the transmission signal due to the transmission of the next transmission signal starting before the reflected wave 4 is received. The sensing area is an area where the object detection apparatus 100 performs sensing to detect the object 2.

However, in a case where characteristics of the transmission signal are changed every time when the processes indicated in this flowchart are repeated, the object detection apparatus 100 is not necessarily required to make the transmission interval wider than a time from transmitting a transmission signal to receiving the reflected wave 4 corresponding to the transmission signal.

There may be a time period during which the object detection apparatus 100 does not transmit a transmission signal, that is, there may be a time period during which the processes of this flowchart are not performed.

Figure 7:
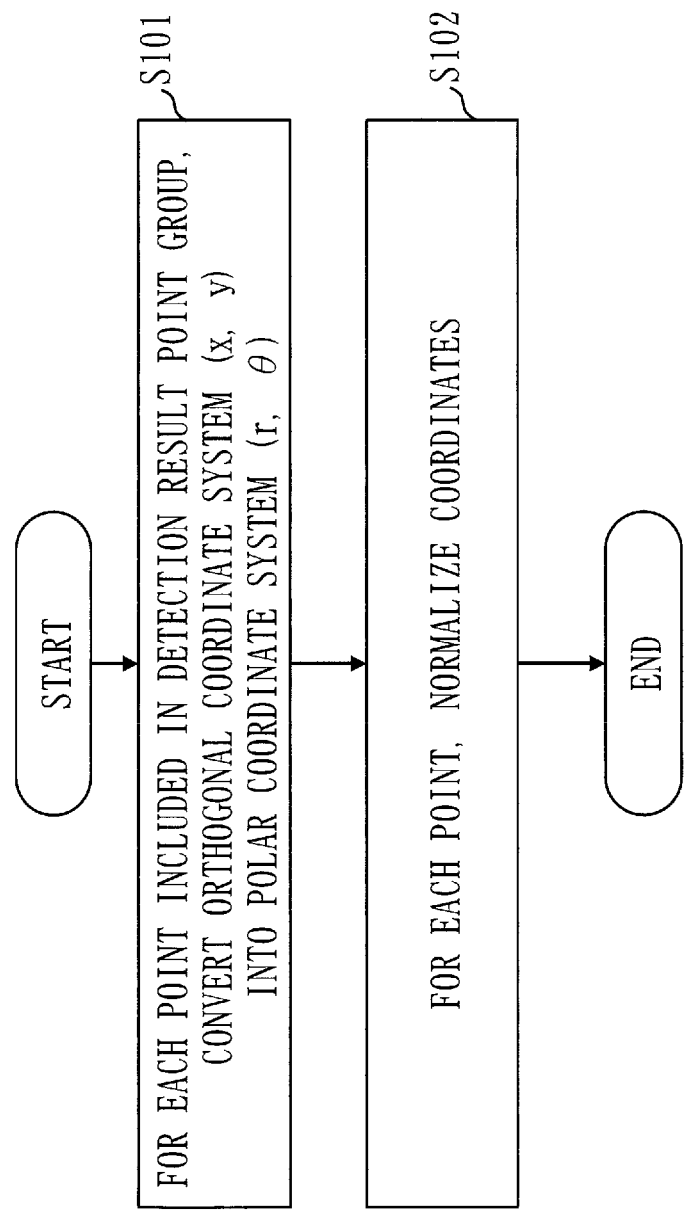
FIG. 7 is a flowchart illustrating operation of a coordinate conversion unit 130 according to Embodiment 1.

FIG. 7 is a flowchart indicating an example of operation of the coordinate conversion unit 130 according to the present embodiment. The operation of the coordinate conversion unit 130 will be described with reference to this drawing.

The coordinate conversion unit 130 performs the processes of step S101 and step S102.

(Step S101: Coordinate Conversion Process)

The coordinate conversion unit 130 performs the coordinate conversion on each point in the detection result point group transmitted from the position coordinate calculation unit 126. Specifically, the position coordinates of each point in the detection result point group are expressed in an orthogonal coordinate system (x, y), and the coordinate conversion unit 130 converts the position coordinates into position coordinates expressed in a polar coordinate system (r, θ) according to |Formula 3| and [Formula 4].

$$r=x^2+y^2 \qquad \text{[Formula 3]}$$

$$\theta=\tan^{-1}(y/x) \qquad \text{[Formula 4]}$$

(Step S102: Normalization Process)

The coordinate conversion unit 130 normalizes each point in the detection result point group expressed in the polar coordinate system (r, θ) calculated in step S101. As an example of the process of this step, r is normalized according to [Formula 5], using a sensor viewing angle range (maximum distance $r_{max}$, maximum angle$\pm\theta_{max}$). A method of the normalization is not limited to the method indicated in [Formula 5], but may be any other method that can be considered by a person skilled in the art. As a specific example, even if $r=r/r_{max}$, $\theta=\theta/(2\theta_{max})$ and each of r and θ are normalized, it is equivalent to [Formula 5].

$$r=r\times(2\theta_{max}/r_{max}) \qquad \text{[Formula 5]}$$

Figure 8:
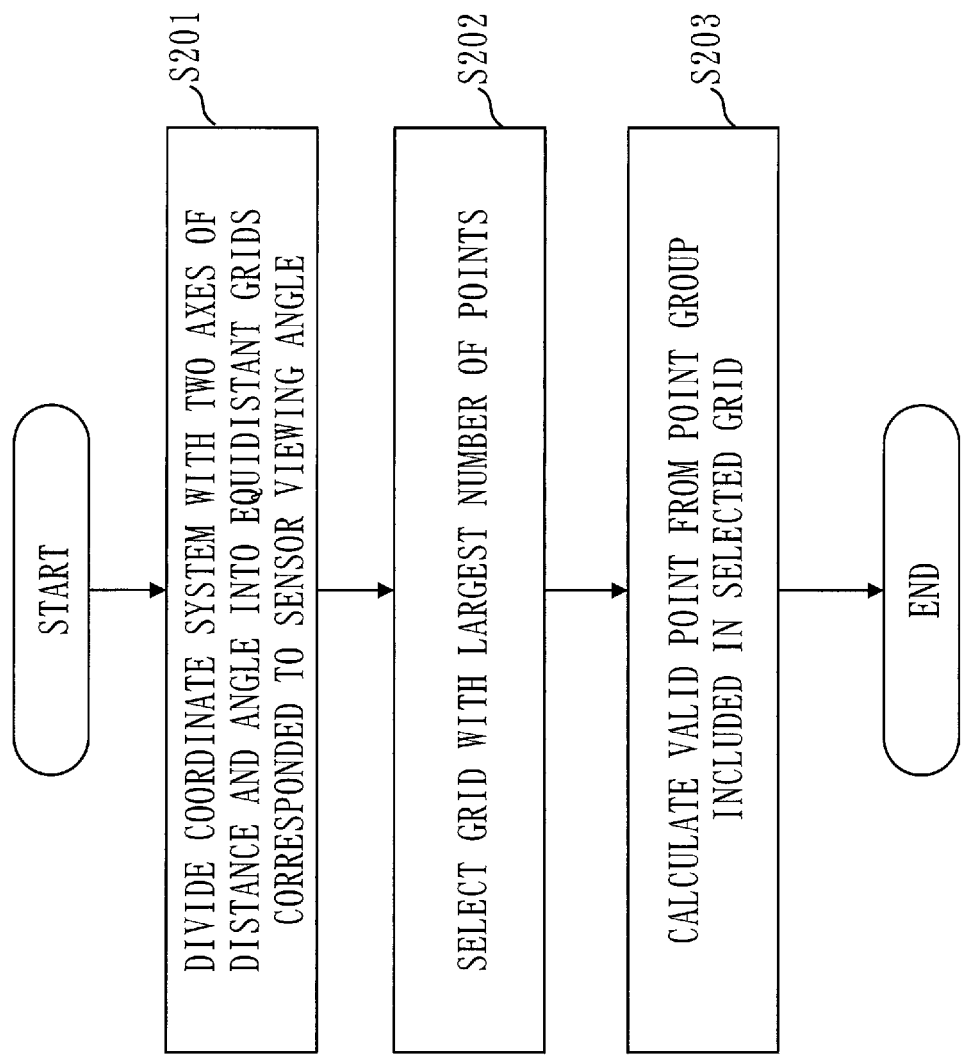
FIG. 8 is a flowchart illustrating operation of a detection point selection unit 135 according to Embodiment 1.

FIG. 8 is a flowchart illustrating an example of operation of the detection point selection unit 135 according to the present embodiment. The operation of the detection point selection unit 135 will be described with reference to this drawing.

The detection point selection unit 135 performs the processes from step S201 to step S203.

Figure 16:
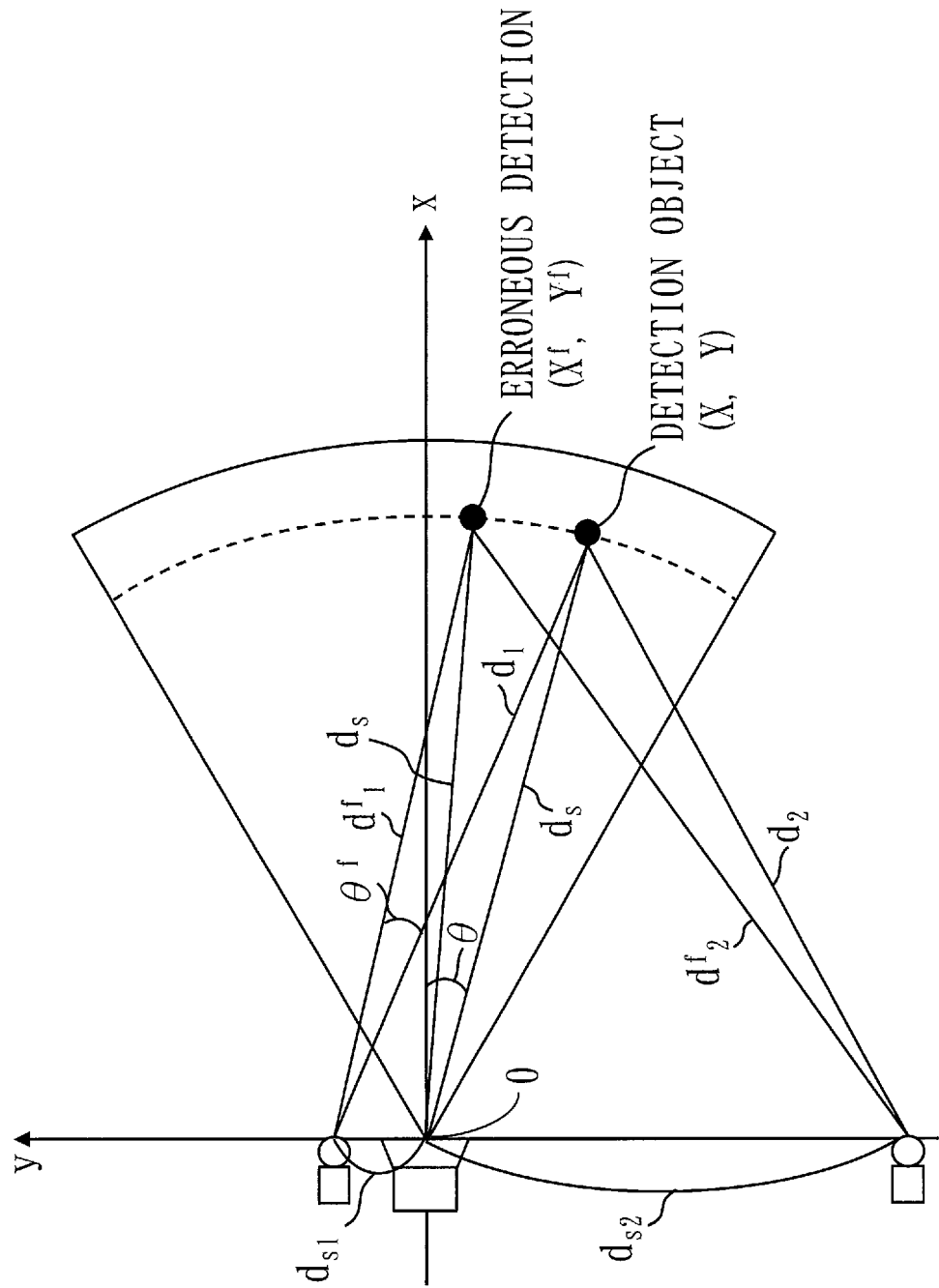
FIG. 16 is a diagram explaining selection of a detection point.

Here, necessity of detection point selection will be described with reference to FIG. 16.

As illustrated in this drawing, in order to calculate true values which are true position coordinates (X, Y) of an object, when the position coordinates are calculated based on the trilateration, $d_{ai}=d_1+d_5$ is required to be included in a distance set Da and $d_{bj}=d_2+d_5$ is required to be included in a distance set Db. However, in such a case where the calculated distance values slightly deviate from the true values, or where noise is erroneously detected, a result of the trilateration may be position coordinates $(X^f, Y^f)$ which differ from the true values.

Further, when the distance calculation unit 125 detects a plurality of peaks, by obtaining the position coordinates based on total combinations, detection points other than the true values are included in the detection result point group obtained by the position coordinate calculation unit 126.

For these reasons, since the detection result point group generally includes a plurality of points, it is required to select or calculate a valid point from the detection result point group. Here, as described above, the plurality of points tend to appear in a circular arc shape.

(Step S201: Grid Division Process)

The detection point selection unit 135 divides the detection result point group transmitted from the coordinate conversion unit 130 into grids. An example of the process of this step will be described below.

When each point is normalized according to [Formula 5], ranges of values possible for a detection point (r, θ) are $0 \leq r \leq 2\theta_{max}$ and $-\theta_{max} \leq \theta \leq \theta_{max}$. That is, when each point included in the detection result point group is illustrated on a coordinate system in which an r-axis and a θ-axis are orthogonal, each point is distributed within a square area whose vertical width and horizontal width are both $2\theta_{max}$. At this time, the detection point selection unit 135 divides the square area into n divisions at equal intervals in both the vertical and horizontal directions. That is, the square area is divided into $n^2$ pieces of squares, each of whose vertical width and horizontal width are both $2\theta_{max}/n$. Each square generated by dividing the square area is referred to as a grid.

(Step S202: Grid Selection Process)

The detection point selection unit 135 selects from among $n^2$ pieces of grids divided in step S201, a grid that includes the largest number of points.

The detection point selection unit 135 may set as a threshold value, the minimum number of points for the selection. As a specific example, when a maximum value of the number of points included in a grid is less than 3, the detection point selection unit 135 may perform a process such as determining that there is "no corresponding grid".

(Step S203: Valid Point Calculation Process)

The detection point selection unit 135 calculates a valid point from a point group included in the grid selected in step S202.

As an example of the process of this step, the detection point selection unit 135 determines that a point is the valid point from among points included in the point group, where the point at which a correlation waveform corresponding to the point or reception strength of a reception signal is the maximum. As a specific example, the object detection apparatus 100 holds in the memory 103, a peak amplitude corresponding to each point together with a distance value corresponding to each point, with respect to the reception signal corresponding to each of the ultrasonic wave receiver 107a and the ultrasonic wave receiver 107b. The detection point selection unit 135 regards as the reception strength at each point, an average value of two amplitudes corresponding to each point.

A method of calculating the reception strength is not limited to the method of calculating the reception strength from the average value. As a specific example, a method of adapting a greater value of the two amplitudes or a method of adopting a smaller value of the two amplitudes, may be used.

Further, a method of calculating the valid point is not limited to the method based on the reception strength. As a specific example, the detection point selection unit 135 may determine that, using a relation between a distance and a noise level, the relation being calculated by another mean, a point at which a Signal-to-Noise (S/N) ratio is the maximum is the valid point, where the Signal-to-Noise (S/N) ratio is a ratio of an amplitude of a peak corresponding to each point to the noise level of a distance value corresponding to each point. Further, the detection point selection unit 135 may determine that a point at which a ratio of the reception strength to a threshold value is the maximum is the valid point. The threshold value may be a constant value that does not depend on the distance value, or a value determined from a function of the distance value. The function may be, as a specific example, a function that takes a value that is inversely proportional to the square of the distance value in consideration of air attenuation of a sound wave, or a function that is a polygonal line corresponded to the distance value. Further, the detection point selection unit 135 may calculate an average value of the positions of the points included in the point group, and regard the calculated average value as the valid value.

Furthermore, in consideration of a case where there is a plurality of objects 2, the detection point selection unit 135 does not limit the number of valid points to 1. As a specific example, the detection point selection unit 135 may determine as valid points, all points each of whose reception strength is equal to or greater than a threshold value.

The detection point selection unit 135 determines that there is "no valid point" when the grid is not selected in step S202.

Description of Effect of Embodiment 1

As described above, according to the present embodiment, the coordinate conversion unit 130 coverts into a polar coordinate system, a coordinate system of position coordinates of each point included in a detection result point group, and the detection point selection unit 135 calculates a valid point, using the position coordinates converted into the polar coordinate system. Therefore, according to the present embodiment, more appropriate valid point can be calculated based on properties of an ultrasonic wave sensor and properties of trilateration.

Further, after converting the detection points so as to be linearly distributed in an angular direction, by converting the coordinate system of the position coordinates of the detection points which tend to appear in a circular arc shape, into the polar coordinate system, the object detection apparatus 100 according to the present embodiment excludes a point corresponding to an outlier value, and outputs a point that is not excluded, as a detection result. Therefore, according to the present embodiment, noise can be removed more appropriately than a case where the noise is removed without performing coordinate conversion.

Other Configurations

Modification 1

Figure 9:
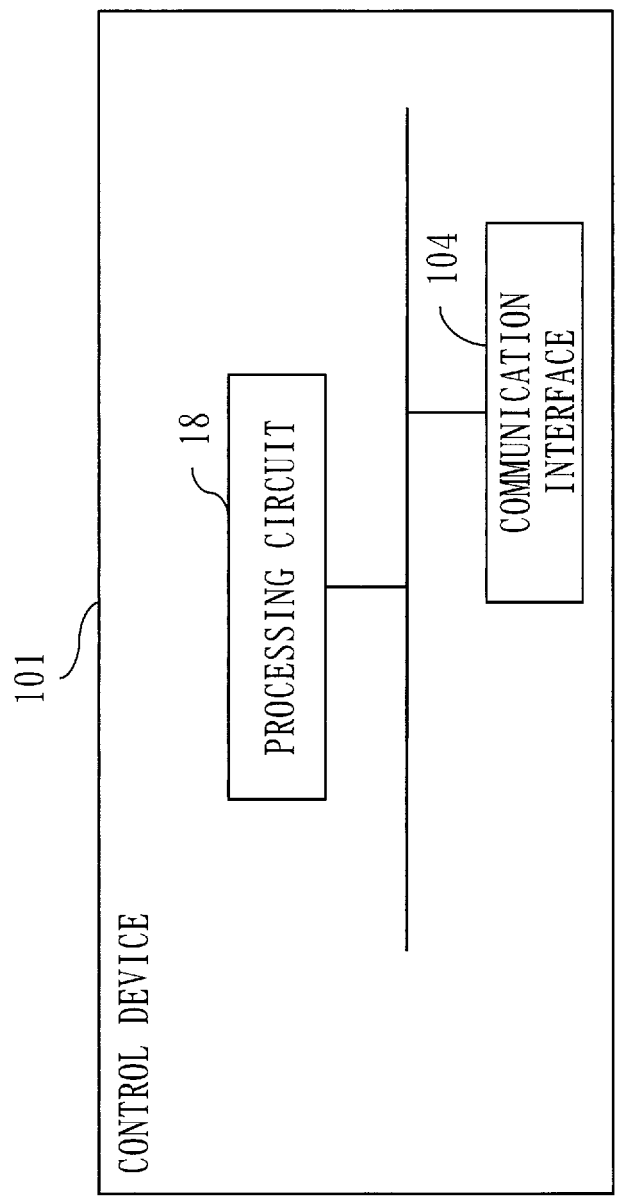
FIG. 9 is a diagram illustrating a hardware configuration example of the control device 101 according to Modification of Embodiment 1.

FIG. 9 illustrates a hardware configuration example of the control device 101 according to the present modification.

The control device 101 includes a processing circuit 18 in place of the processor 11, the processor 11 and the main storage device 12, the processor 11 and the auxiliary storage device 13, or the processor 11, the main storage device 12 and the auxiliary storage device 13.

The processing circuit 18 is hardware that implements at least part of the units included in the control device 101.

The processing circuit 18 may be dedicated hardware, or may be a processor that executes programs stored in the main storage device 12.

When the processing circuit 18 is the dedicated hardware, the processing circuit 18 is, as a specific example, a single circuit, a composite circuit, a programmed processor, a parallel-programmed processor, an Application Specific Integrated Circuit (ASIC), a Field Programmable Gate Array (FPGA), or a combination of these.

The control device 101 may include a plurality of processing circuits as an alternative to the processing circuit 18. The plurality of processing circuits share the role of the processing circuit 18.

In the control device 101, some functions may be implemented by dedicated hardware, and the remaining functions may be implemented by software or firmware.

The processing circuit 18 is implemented by, as a specific example, hardware, software, firmware, or a combination of these.

The processor 11, the main storage device 12, the auxiliary storage device 13, and the processing circuit 18 are collectively referred to as "processing circuitry". That is, the functions of the individual functional components of the control device 101 are implemented by the processing circuitry.

The control device 101 according to another embodiment may also have the same configuration as the present modification.

Embodiment 2

Differences from the above-described embodiment will be mainly described below with reference to the drawings.

Description of Configuration

Although it is not illustrated, the object detection apparatus 100 includes an object detection unit 122b in place of the object detection unit 122.

Figure 10:
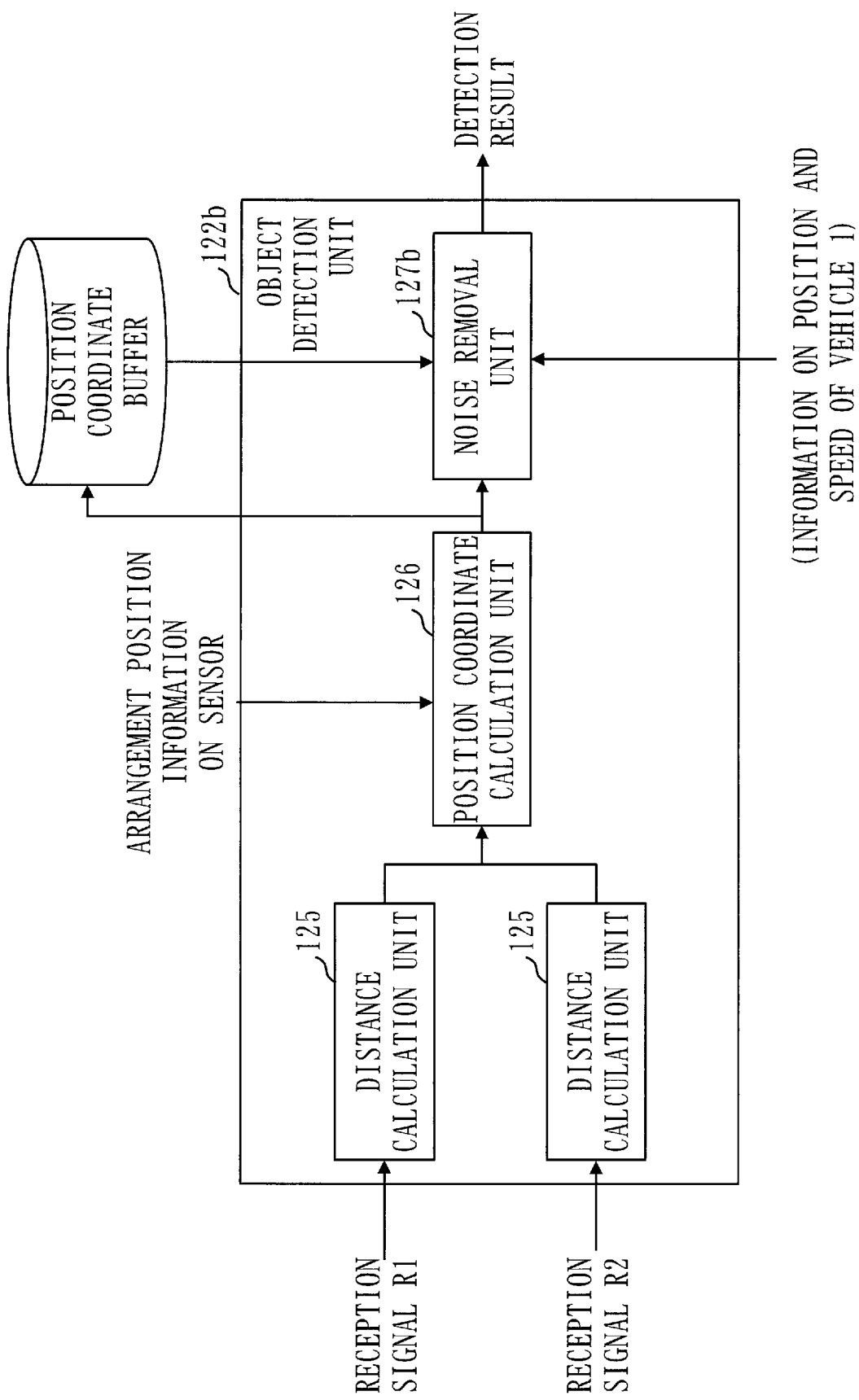
FIG. 10 is a functional block diagram of an object detection unit 122b according to Embodiment 2.

FIG. 10 illustrates a specific example of a functional block diagram of the object detection unit 122b. As illustrated in this drawing, it differs from Embodiment 1 in that the object detection unit 122b includes a noise removal unit 127b in place of the noise removal unit 127, and includes a position coordinate buffer which holds a detection result point group being an output result of the position coordinate calculation unit 126, and which is an area in the memory 103.

The position coordinate buffer holds detection result point groups for a predetermined processing cycle from the latest detection result point group to the past detection result point groups, and deletes the oldest detection result point group from the position coordinate buffer every time when a detection result point group is newly input to the position coordinate buffer.

Figure 11:
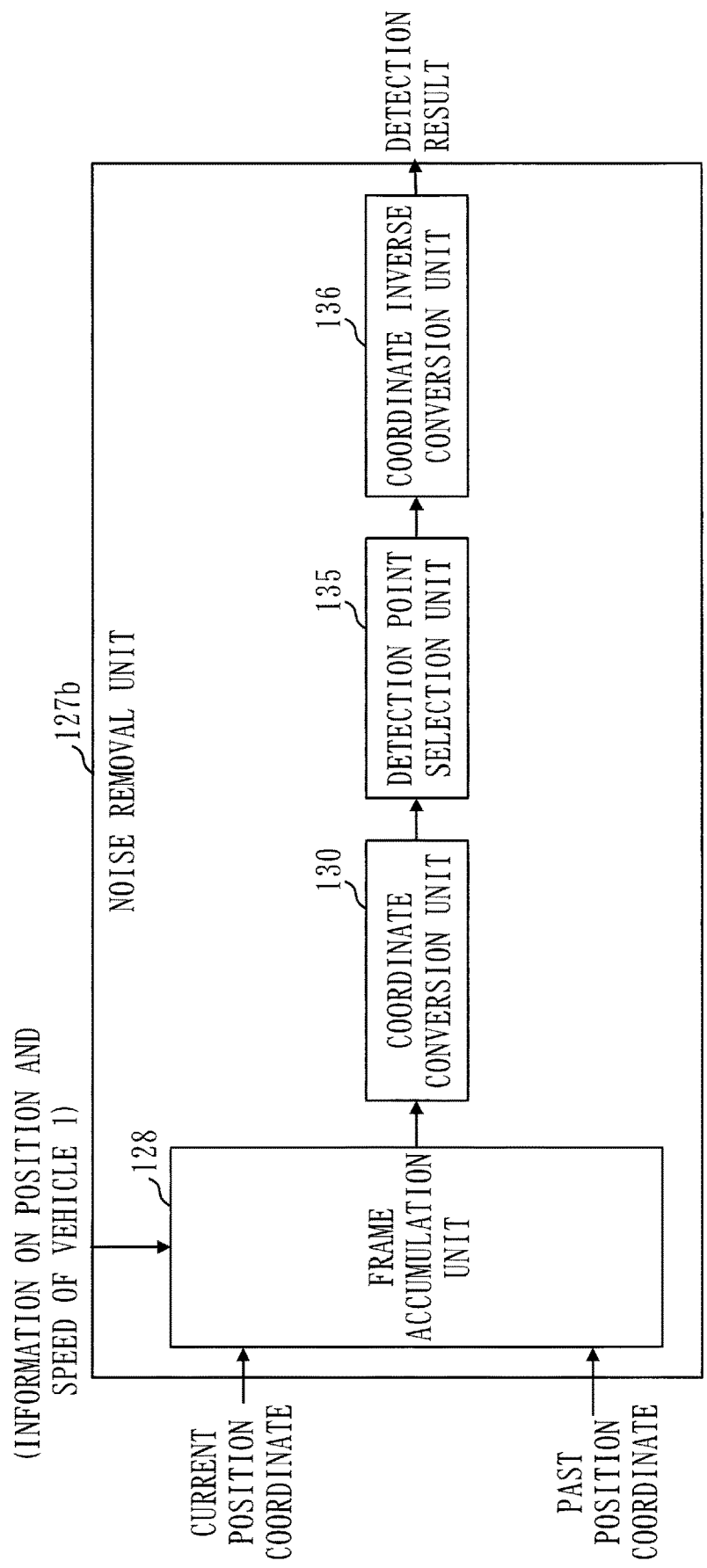
FIG. 11 is a functional block diagram of a noise removal unit 127b according to Embodiment 2.

FIG. 11 illustrates a specific example of a functional block diagram of the noise removal unit 127b. The noise removal unit 127b includes the coordinate conversion unit 130, the detection point selection unit 135, and the coordinate inverse conversion unit 136, as with the noise removal unit 127, and further includes a frame accumulation unit 128.

The noise removal unit 127b removes from the detection result point group, detection points corresponding to noise, based on the position coordinates of each detection point included in detection result point groups in a past time range. The noise removal unit 127b may remove the detection points corresponding to noise from the detection result point group, based on at least one of the speed and the position of a moving body on which the object detection apparatus 100 is installed.

The frame accumulation unit 128 increases the number of points in detection result point groups by accumulating detection result point groups (hereinafter referred to as current position coordinates) output from the position coordinate calculation unit 126 in a current frame and accumulating detection result point groups (hereinafter referred to as past position coordinates) output from the position coordinate calculation unit 126 in each of past frames, and transmits its result to the coordinate conversion unit 130. The current frame is the latest processing cycle. The past frame is a processing cycle before the current frame and for the predetermined processing cycle. The past frame corresponds to the past time range.

Description of Operation

Operation of a frame accumulation process by the frame accumulation unit 128 will be described. As an example of the operation, the frame accumulation unit 128 synthesizes all detection result point groups while assuming that the current position coordinates and the past position coordinates are on the same map coordinate system. That is, the frame accumulation unit 128 increases the number of points included in the detection result point group by regarding as the current position coordinates, the past position coordinates held in the position coordinate buffer.

As another operation of the frame accumulation process, operation is mentioned that the position coordinate buffer holds position information and speed information on the vehicle 1 in each processing cycle, together with the detection result point group in each processing cycle, and the frame accumulation unit 128 converts to the coordinate system of the position coordinates in the current processing cycle, the position coordinate system of the position coordinates of the detection result point group in each past processing cycle, using the information held by the position coordinate buffer, and synthesizes the converted past position coordinates and the current position coordinates. With this operation, even if the vehicle 1 is moving, that is, even if the position of the origin of the coordinate system in each processing cycle differs from each other on a map, the frame accumulation unit 128 is able to properly accumulate frames.

The frame accumulation unit 128 transmits to the coordinate conversion unit 130, the detection result point group increased by the frame accumulation process.

Description of Effect of Embodiment 2

As described above, according to the present embodiment, the detection point selection unit 135 has more criteria for calculating a valid point, by increasing the number of points included in a detection result point group, using a detection result in a past frame. Therefore, according to the present embodiment, it is possible to calculate more appropriate valid point.

Embodiment 3

Differences from the above-described embodiments will be mainly described below with reference to the drawings.

Description of Configuration

In the present embodiment, the object detection process in the object detection apparatus 100 differs from that in Embodiment 1.

Differences between the present embodiment and Embodiment 1 will be described below.

Although it is not illustrated, the object detection apparatus 100 includes an object detection unit 122c in place of the object detection unit 122.

Although it is not illustrated, the object detection unit 122c includes a noise removal unit 127c in place of the noise removal unit 127, and also includes a position coordinate buffer, as with Embodiment 2.

Figure 12:
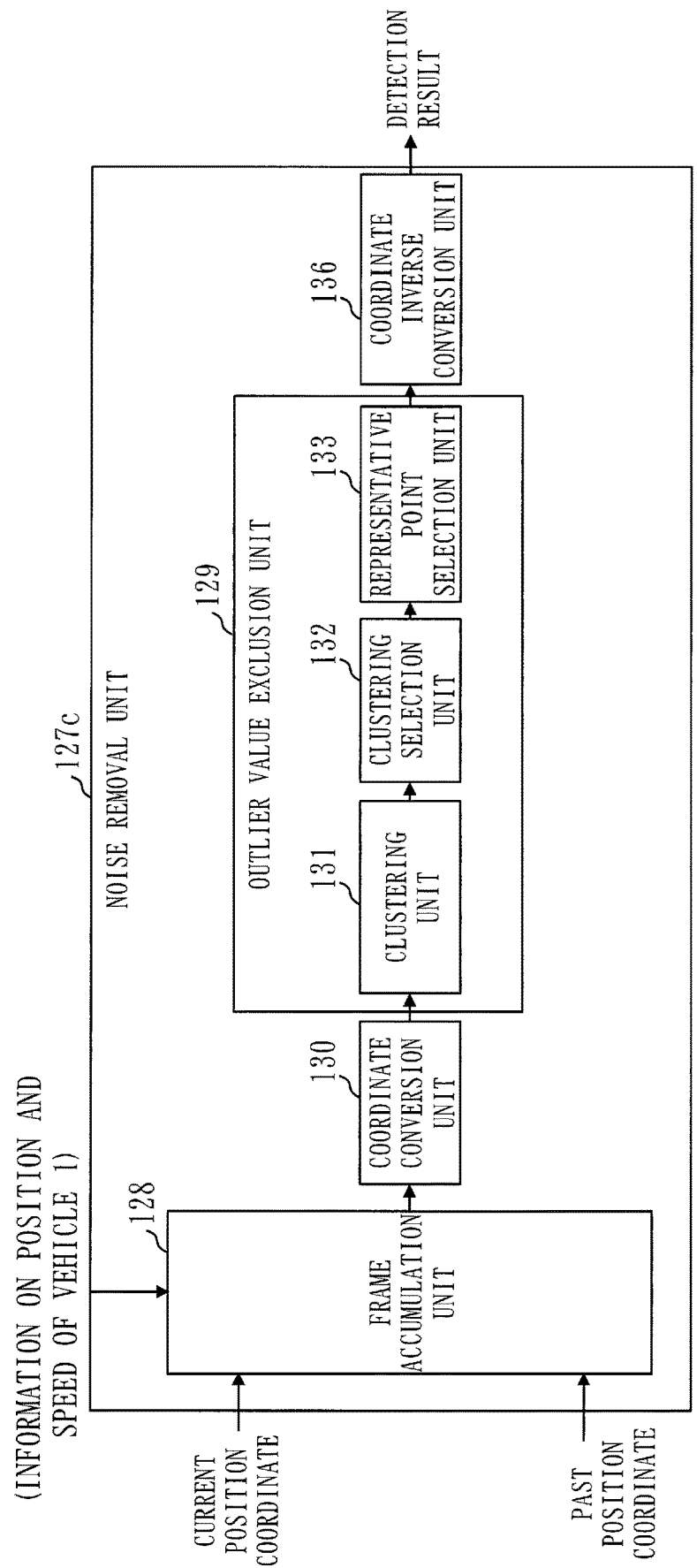
FIG. 12 is a functional block diagram of a noise removal unit 127c according to Embodiment 3.

FIG. 12 illustrates a specific example of a functional block diagram of the noise removal unit 127c. As with the noise removal unit 127b, the noise removal unit 127c includes the frame accumulation unit 128, the coordinate conversion unit 130, and the coordinate inverse conversion unit 136, and includes an outlier value exclusion unit 129 in place of the detection point selection unit 135 included in the noise removal unit 127b.

The noise removal unit 127c classifies into one of at least one of clusters, each detection point included in the detection result point group, removes from among the at least one of clusters, a cluster that includes a detection point which is less than a first threshold value, calculates a representative point based on a cluster that has not been removed, and by regarding as noise, a detection point that is not the calculated representative point, removes from the detection result point group the detection point corresponding to the noise. The representative point is a point indicating position coordinates at which the object 2 is estimated to be actually present.

Further, first, when the cluster that has not been removed includes a plurality of clusters, the noise removal unit 127c regards as a target cluster, each of the clusters that have not been removed, and calculates an average distance which is an average value of distances each of which corresponds to each of the position coordinates included in the target cluster, and an average angle which is an average value of angles each of which corresponds to each of the position coordinates included in the target cluster. Next, when there are two or more clusters in which a difference in the average distance is less than or equal to a second threshold value, and a difference in the average angle is less than or equal to a third threshold value, the noise removal unit 127c may group two or more clusters, regard as a valid cluster, each of a cluster other than a cluster that includes the number of detection points which is less than a fourth threshold value, among clusters included in a group of the two or more clusters, and of a cluster that has not been grouped among the clusters that have not been removed, and calculate a representative point based on each valid cluster. The noise removal unit 127c may decide whether or not it is the representative point, depending on the property of the reception signal corresponding to each detection point included in each valid cluster.

As illustrated in this drawing, the outlier value exclusion unit 129 includes a clustering unit 131, a clustering selection unit 132, and a representative point selection unit 133.

The clustering unit 131 clusters the detection result point group transmitted from the coordinate conversion unit 130, assigns to each point included in the detection result point group, information on a cluster Identification (ID) indicating which cluster each point belongs to, and transmits a clustering result to the clustering selection unit 132. The clustering result includes the information indicating the detection result point group and the cluster ID corresponding to each point included in the detection result point group. Details of processing of the clustering unit 131 will be described below.

The clustering selection unit 132 classifies each cluster indicated in the clustering result transmitted from the clustering unit 131 into either a valid cluster or an invalid cluster, and transmits the valid cluster to the representative point selection unit 133. Details of processing of the clustering selection unit 132 will be described below.

The representative point selection unit 133 calculates a representative point from a point group included in the valid cluster transmitted from the clustering selection unit 132, and transmits the calculated representative point to the coordinate inverse conversion unit 136. Details of processing of the coordinate inverse conversion unit 136 will be described below.

Description of Operation

Figure 13:
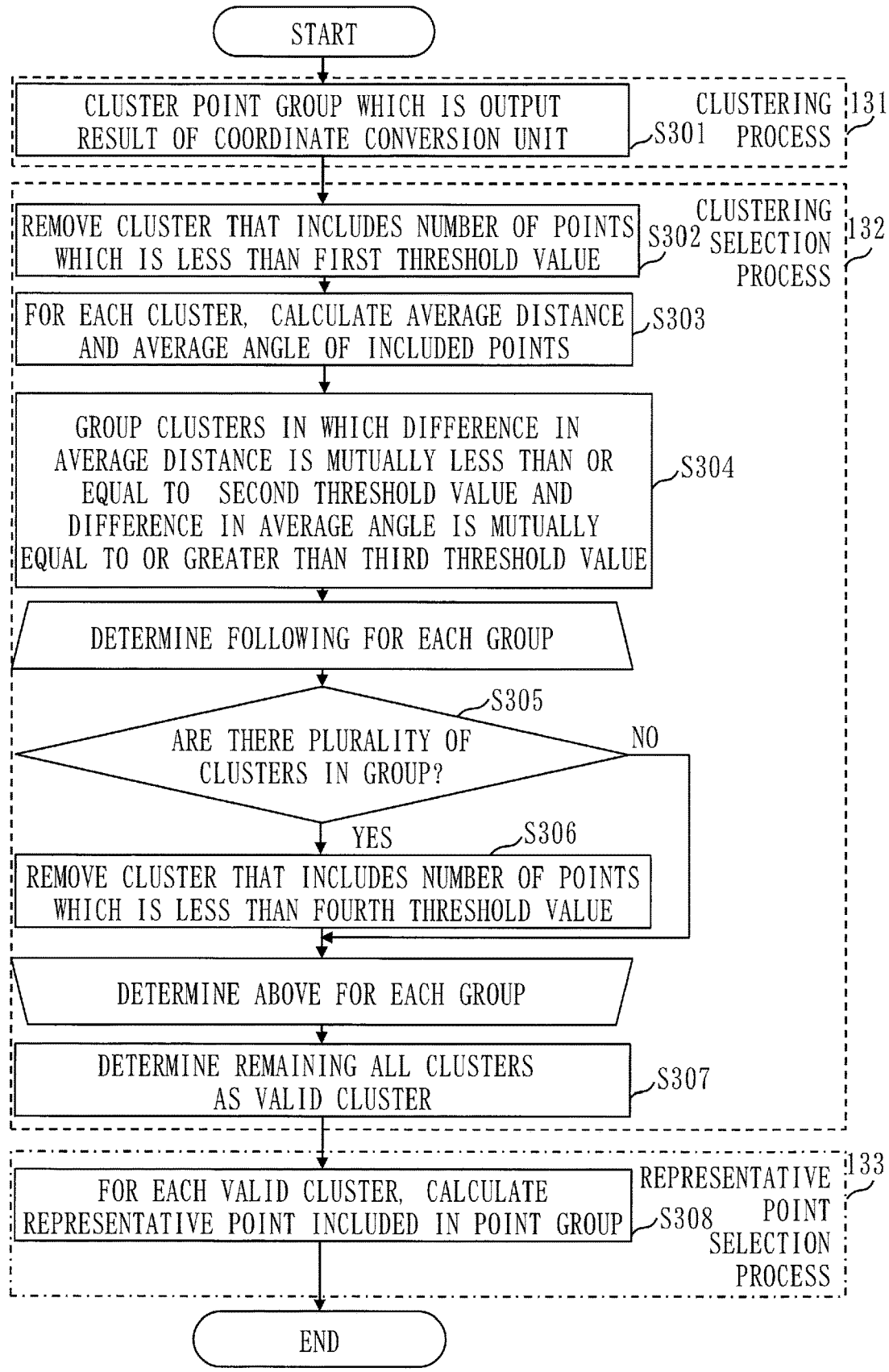
FIG. 13 is a flowchart illustrating operation of an outlier value exclusion unit 129 according to Embodiment 3.

FIG. 13 is a flowchart illustrating an example of operation of the outlier value exclusion unit 129 according to the present embodiment. The operation of the outlier value exclusion unit 129 will be described with reference to this drawing.

The clustering unit 131 performs the process of step S301.
(Step S301: Clustering Process)
The clustering unit 131 clusters the detection result point group transmitted from the coordinate conversion unit 130.

A method of clustering used by the clustering unit 131 is not particularly limited, and as an example, is a well-known density-based clustering method called Density-Based Spatial Clustering of Applications with Noise (DBSCAN).

Here, the clustering result will be described with reference to FIGS. 17 and 18.

Figure 17:
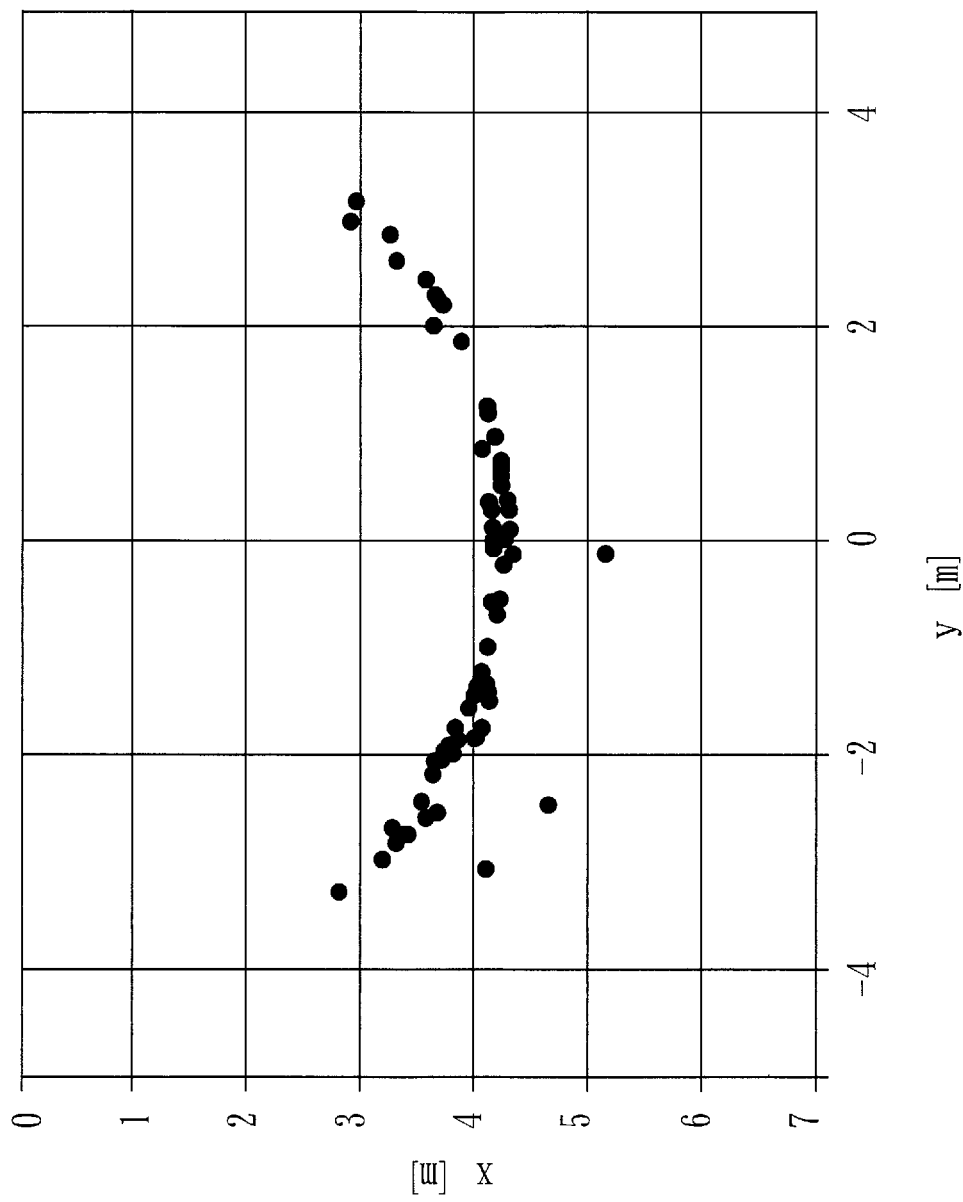
FIG. 17 is a diagram illustrating an example of a detection result point group transmitted from the coordinate conversion unit 130.

FIG. 17 illustrates an example of the detection result point group transmitted from the coordinate conversion unit 130. However, in order to clearly indicate a tendency of the point group to appear in a circular arc shape, the tendency being the properties of the ultrasonic wave sensor and the properties of the trilateration, the drawing illustrates a result of inversely converting the detection result point group and returning the converted detection result point group to the orthogonal coordinate system, that is, an output result of the frame accumulation unit 128.

Figure 18:
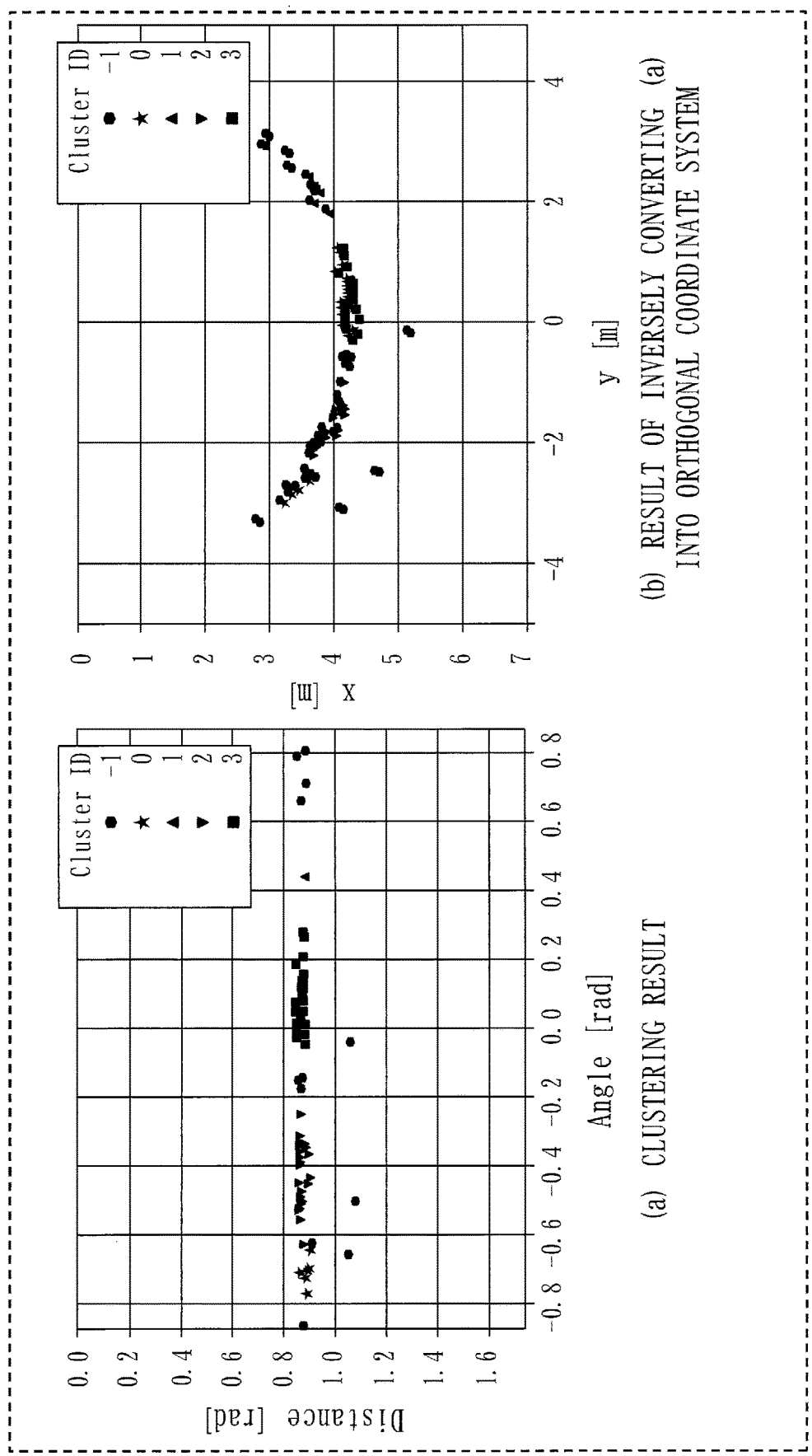
FIG. 18 is a diagram explaining a clustering result, where (a) is a diagram illustrating the clustering result, and (b) is a diagram illustrating a result of inversely converting (a) into an orthogonal coordinate system.

FIG. 18 illustrates a result of converting each point included in the detection result point group in FIG. 17 by the coordinate conversion unit 130 and clustering using DBSCAN by the clustering unit 131. FIG. 18 (*a*) illustrates the clustering result. FIG. 18 (*b*) illustrates a result of inversely converting FIG. 18 (*a*) and returning the coordinate system to the orthogonal coordinate system, as with FIG. 17.

In FIG. 18, the detection result point group is divided into four clusters (cluster ID=0, 1, 2, 3). The cluster ID=−1 indicates a point belonging to a cluster that consists of only one point, that is, a point that does not form a cluster.

As described above, in step S301, the clustering unit 131 performs the process of assigning the cluster ID to each point included in the detection result point group.

The clustering selection unit 132 performs the processes from step S302 to step S307.
(Step S302: Small Cluster Removal Process)
The clustering selection unit 132 determines that from among clusters indicated in the clustering result calculated in step S301, a cluster that includes the number of points which is less than the first threshold value is an invalid cluster, and removes the invalid cluster. As a specific example, if the first threshold is set to 2, a cluster whose cluster ID is −1 in the example indicated in FIG. 18 is removed as the invalid cluster.

When all clusters are removed in step S302, the clustering selection unit 132 does not perform the subsequent processes, and the outlier value exclusion unit 129 outputs information indicating a result indicating that there is "no representative point".
(Step S303: Cluster Average Calculation Process)
The clustering selection unit 132 calculates an average value of points included in a cluster, for each cluster that has remained as a result of executing step S302. Here, since the coordinate system of each point included in each cluster is converted by the coordinate conversion unit 130 into the polar coordinate system, the process of this step is equivalent to calculating the average distance and the average angle of the points included in the cluster. To be precise, since the normalization process is performed for each point, the units of the average value of the two axes in the coordinate system are not always the distance and the angle. As a specific example, when the normalization is performed using [Formula 5], the units of the average values of the two axes are both units of angles.
(Step S304: Grouping Process)
The clustering selection unit 132 groups for clusters that have remained in step S302, clusters in which the difference in average distance calculated in step S303 is less than or equal to the second threshold value and the difference in the average angel calculated in step S303 is equal to or greater than the third threshold value. As a specific example, when each point is normalized using [Formula 5], the second threshold value and the third threshold value may be set to 4°.

According to the process of this step, when there are "a plurality of clusters that are substantially equidistant and have mutually different angles", the plurality of clusters are included in the same group.

(Step S305: Group Length Determination Process)

The clustering selection unit 132 determines whether or not each group calculated in step S304 includes a plurality of clusters.

The clustering selection unit 132 executes step S306 for a group that includes the plurality of clusters, and does not execute step S306 for a group that includes only one cluster.

(Step S306: Cluster Removal Process)

The clustering selection unit 132 determines that for each group that includes the plurality of clusters calculated in step S305, a cluster that includes the number of points which is less than the fourth threshold value is an invalid cluster, and removes the invalid cluster. The fourth threshold value is equal to or greater than the first threshold value. As a specific example, if the fourth threshold value is set to "the maximum value of the number of points included in each cluster included in the group", only a cluster that includes the most points in each group remains and other clusters are removed. The fourth threshold value may be a variable value or a constant value.

By the process of this step, when there is a plurality of clusters that are substantially equidistant and have mutually different angles, only a cluster that includes a relatively large number of points remains among the plurality of clusters.

(Step S307: Valid Cluster Determination Process)

The clustering selection unit 132 determines that all clusters that have remained after execution of steps S305 and S306, as valid clusters. That is, a cluster that is independent and a cluster selected from among the plurality of clusters that are substantially equidistant and have mutually different angles remain after the execution of steps S305 and S306, and the clustering selection unit 132 regards the remaining clusters as the valid cluster.

The representative point selection unit 133 performs the process of step S308.

(Step S308: Representative Point Calculation Process)

The representative point selection unit 133 calculates for each valid cluster determined in step S307, a representative point from the point group included in the valid cluster.

As an example of the process of this step, the representative point selection unit 133 determines among the points included in the point group, a point at which a correlation waveform corresponding to the point or reception strength of a reception signal corresponding to the point is the maximum, as the representative point. A method of calculating the representative point is not limited to a method based on the reception strength. As a specific example the representative point selection unit 133 may determine a point at which the S/N ratio is the maximum, as the representative point, or may determine a point at which a ratio of the reception strength to the fifth threshold value is the maximum, as the representative point. Alternatively, the representative point selection unit 133 may calculate an average of the point group and use the average as the representative point. These processes are the same as the valid point calculation process by the detection point selection unit 135.

Further, in consideration of a case where there is a plurality of objects 2 in one valid cluster, the representative point selection unit 133 does not limit the representative point to one point. As a specific example, the representative point selection unit 133 may determine that all points each of whose reception strength is equal to or greater than a threshold value are valid points.

Furthermore, for each valid cluster, the representative point selection unit 133 may calculate the representative point using only points included in the current position coordinates from among the points included in the point group, without using all points included in the point group included in the valid cluster. In addition, the representative point selection unit 133 may calculate the representative point using only points included in the position coordinates for frames from the present to the past sixth threshold value frame.

According to the process of this step, the representative point is calculated for each valid cluster.

When it is determined in step S307 that there is no valid cluster, a result indicating "there is no representative point" is output.

Here, a representative point calculation result will be described with reference to FIG. 19.

Figure 19:
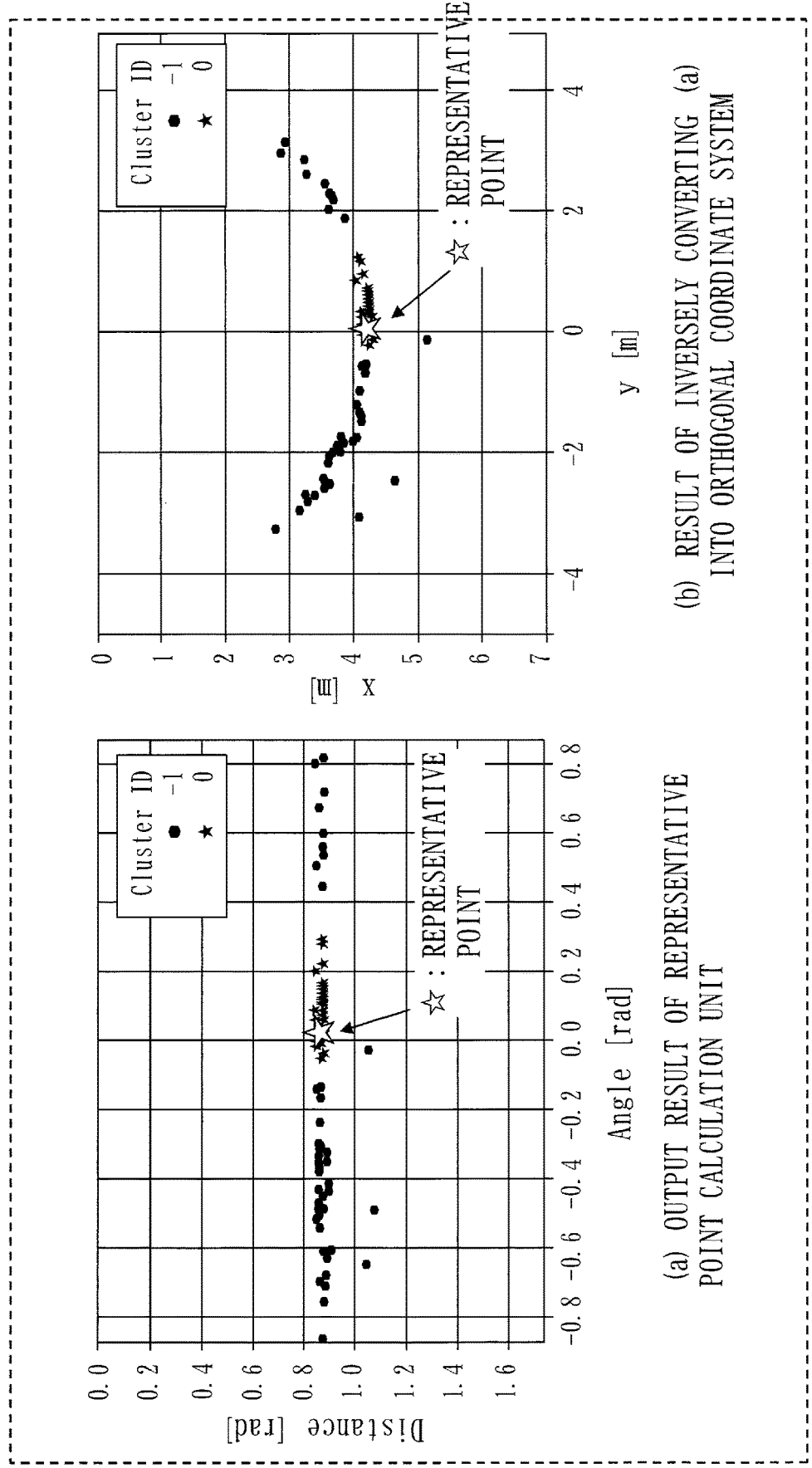
FIG. 19 is a diagram explaining a representative point calculation result, where (a) is a diagram illustrating an output result of a representative point calculation unit, and (b) is a diagram illustrating a result of inversely converting (a) into the orthogonal coordinate system.

FIG. 19 (a) illustrates a result of calculating a valid cluster by the processes from step S302 to step S307, for the clustering result illustrated in FIG. 18. Further, the representative point calculated by the process of step S308 is indicated using a star mark in FIG. 19 (a). The cluster ID of each point that belongs to a cluster other than the valid cluster is set to −1.

FIG. 19 (b) illustrates a result of inversely converting FIG. 19 (a) and returning the coordinate system to the orthogonal coordinate system, in order to illustrate FIG. 19 (a) in an easy-to-understand manner.

FIG. 19 illustrates an example of a detection result in a case where there is one object 2 at the position of (x, y)=(4, 0)m. In this example, it can be confirmed from FIG. 19 (b) that the representative point that is substantially consistent with a true value is calculated from among the point group that appears in the circular arc shape.

Description of Effect of Embodiment 3

As described above, according to the present embodiment, compared with a case where the detection point selection unit 135 directly calculates a valid point from a detection result point group transmitted from the coordinate conversion unit 130 as with the above-described embodiments, it is possible to calculate more appropriate representative point by excluding an outlier value using clustering.

Embodiment 4

Differences from the above-described embodiments will be mainly described below with reference to the drawings.

Description of Configuration

In the present embodiment, the object detection process in the object detection apparatus 100 differs from that in Embodiment 1.

Differences between the present embodiment and Embodiment 1 will be described below.

Although it is not illustrated, the object detection apparatus 100 includes an object detection unit 122d in place of the object detection unit 122. Although it is not illustrated, the object detection unit 122d includes a noise removal unit 127d in place of the noise removal unit 127, and also includes a position coordinate buffer as with Embodiment 3.

Figure 14:
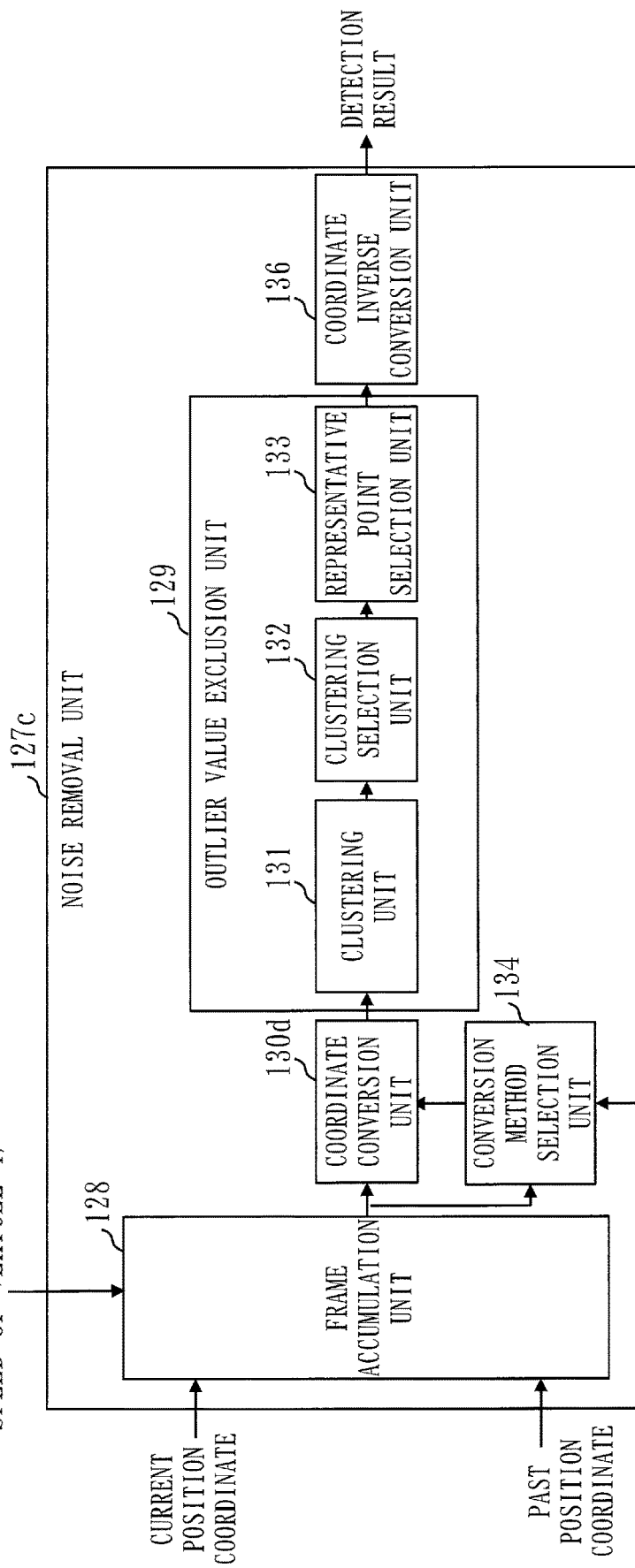
FIG. 14 is a functional block diagram of a noise removal unit 127d according to Embodiment 4.

FIG. 14 illustrates a specific example of a functional block diagram of the noise removal unit 127d. The noise removal unit 127d includes the frame accumulation unit 128, the outlier value exclusion unit 129, and the coordinate inverse conversion unit 136, as with the noise removal unit 127c, includes a coordinate conversion unit 130d in place of the coordinate conversion unit 130 included in the noise removal unit 127c, and also includes a conversion method selection unit 134.

The conversion method selection unit 134 decides an appropriate method of the coordinate conversion, using the detection result point group transmitted from the frame accumulation unit 128 and arrangement position information of each of the ultrasonic wave transmitter 106, the ultrasonic wave receiver 107a, and the ultrasonic wave receiver 107b. Then, the conversion method selection unit 134 transmits information indicating the decided method to the coordinate conversion unit 130d. The conversion method selection unit 134 decides the method of converting the coordinate system of each detection point included in the detection result point group, based on the position of the transmitter, the position of each of the plurality of receivers and the position coordinates of each detection point included in the detection result point group.

A method by which the conversion method selection unit 134 decides the method of the coordinate conversion, is not particularly limited. As an example, if the number of ultrasonic wave receivers 107 is set to three pieces instead of two pieces, in a case where each of ultrasonic wave receivers 107 is arranged in a three-dimensional space, each point in the detection result point group is represented by three-dimensional coordinates (x, y, z) in place of two-dimensional coordinates (x, y). Therefore, in this example, as the method of the coordinate conversion, the conversion method selection unit 134 may decide to use spherical coordinate system conversion or cylindrical coordinate system conversation in place of the polar coordinate system conversion, depending on the arrangement of each ultrasonic wave receiver 107.

Further, as another example, when points known in advance to be noise are included in the detection result point group, the conversion method selection unit 134 may decide to perform the polar coordinate system conversion after removing the points known to be the noise. This case is, as a specific example, a case where there is an obstacle that is not a detection target at a known position around each of the ultrasonic wave transmitter 106 and the ultrasonic wave receiver 107.

The method of the coordinate conversion is not limit to the above examples, and may be various methods conceived by a person skilled in the art.

The coordinate conversion unit 130d performs the coordinate conversion using the conversion method decided by the conversion method selection unit 134 and the normalization, for each point included in the detection result point group transmitted from the frame accumulation unit 128, and transmits its result to the outlier value exclusion unit 129. The coordinate conversion unit 130d converts the position coordinates of each detection point included in the detection result point group into the coordinate system according to the decided method. Details of the processing by the coordinate conversion unit 130d will be described below.

Description of Operation

Figure 15:
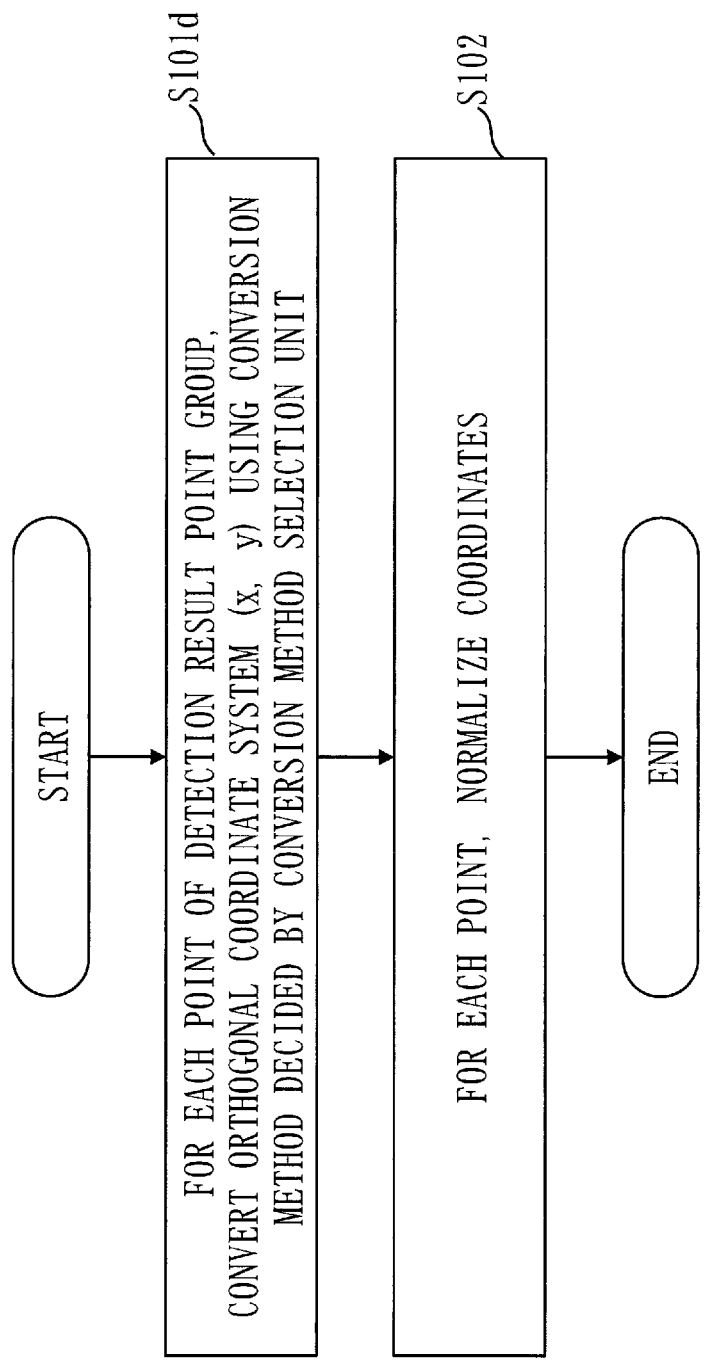
FIG. 15 is a flowchart illustrating operation of a coordinate conversion unit 130d according to Embodiment 4.

FIG. 15 is a flowchart illustrating an example of operation of the coordinate conversion unit 130d according to the present embodiment. The operation of the coordinate conversion unit 130d will be described with reference to this drawing.

The coordinate conversion unit 130d performs the processes of steps S101d and S102.

(Step S101d: Coordinate Conversion Process)

The basic process of step S101d is the same as the coordinate conversion process of the coordinate conversion unit 130. However, a method of coordinate conversion used by the coordinate conversion unit 130d is not limited to the polar coordinate system conversion, and the coordinate conversion unit 130d uses the method of the coordinate conversion decided by the conversion method selection unit 134.

(Step S102: Normalization Process)

The process of this step is the same as the normalization process by the coordinate conversion unit 130. The coordinate conversion unit 130d normalizes a result of executing the coordinate conversion in step S101d.

Description of Effect of Embodiment 4

As described above, according to the present embodiment, by selecting an appropriate method of coordinate conversion depending on such as detection result point group or arrangement position information on a sensor, it is possible to convert position coordinates of each point included in the detection result point group into a format in which clustering is eased to be performed. Therefore, according to the present embodiment, it is possible to calculate more appropriate representative point.

Other Embodiments

The above embodiments can be freely combined, or any component of each of the embodiments can be modified. Alternatively, in each of the embodiments, any component can be omitted.

Alternatively, the embodiments are not limited to those presented in Embodiments 1 to 4, and various modifications can be made as needed. The procedures described using the flowcharts or the like may be suitably modified.

Further, in each embodiment, another sensor that emits spherical waves as with an ultrasonic wave sensor may be used in place of the ultrasonic wave sensor or a sonar.

Alternatively, in each embodiment, using another type of a sensor such as a millimeter wave radar in place of the ultrasonic wave sensor or the sonar, position coordinates may be calculated using the trilateration based on a measurement result of the other type of the sensor.

REFERENCE SIGNS LIST

1: vehicle; 2: object; 3: transmission wave; 4: reflected wave; 5: direct wave; 11: processor; 12: main storage device; 13: auxiliary storage device; 103: memory; 104: communication interface; 18: processing circuit; 19: OS; 100: object detection apparatus; 101: control device; 105: transmission amplifier; 106: ultrasonic wave transmitter; 107, 107a, 107b: ultrasonic wave receiver; 108, 108a, 108b: reception amplifier; 112: signal line; 121: synchronization unit; 122, 122b, 122c, 122d: object detection unit; 123: transmission unit; 124: reception unit; 125: distance calculation unit; 126: position coordinate calculation unit; 127, 127b, 127c, 127d: noise removal unit; 128: frame accumulation unit; 129: outlier value exclusion unit; 130, 130d: coordinate conversion unit; 131: clustering unit; 132: clustering selection unit; 133: representative point selection unit; 134: conversion method selection unit; 135: detection point selection unit; 136: coordinate inverse conversion unit; 200: rear-stage module; R1, R2: reception signal.

The invention claimed is:

1. An object detection apparatus comprising:
processing circuitry to:
regard as a target reception signal, each of a plurality of reception signals which is a signal received by each of a plurality of receivers and is a signal corresponding to a transmission signal which is a signal transmitted by a transmitter and reflected by an object, to detect as a target peak, each of at least one of peaks corresponding to the target reception signals, and to calculate as a calculated distance, a distance corresponding to the target peak;
calculate a detection point indicating position coordinates indicating a position at which the object is estimated to be present, based on each combination of the calculated distance corresponding to each of the plurality of reception signals, a position of the transmitter, and each position of the plurality of receivers, and to regard as a detection result point group, a set that consists of the calculated detection points; and
remove from the detection result point group, a detection point corresponding to noise, based on the position coordinates of each detection point included in the detection result point group.

2. The object detection apparatus according to claim 1, wherein
the processing circuitry converts a coordinate system of the position coordinates of each detection point included in the detection result point group, into a coordinate system suitable for representing a convex surface, and
the processing circuitry removes a detection point corresponding to noise from the detection result point group, based on the position coordinates of each detection point whose coordinate system has been converted into the coordinate system suitable for representing the convex surface.

3. The object detection apparatus according to claim 2, wherein
the processing circuitry decides a method of converting a coordinate system of each detection point included in the detection result point group, based on the position of the transmitter, each position of the plurality of receivers, and the position coordinates of each detection point included in the detection result point group, and
the processing circuitry converts the coordinate system of the position coordinates of each detection point included in the detection result point group, according to the decided method.

4. The object detection apparatus according to claim 1, wherein
the processing circuitry divides into a plurality of regions, a region that includes detection points included in the detection result point group, selects from among the plurality of regions, a region that includes the largest number of detection points, calculates a valid point indicating position coordinates at which the object is estimated to be actually present, based on the position coordinates of each detection point included in the selected region, and by regarding as noise, a detection point that is not the calculated valid point, removes from the detection result point group, the detection point corresponding to the noise.

5. The object detection apparatus according to claim 4, wherein
the processing circuitry decides whether or not the detection point is the valid point depending on a property of a reception signal corresponding to each detection point included in the selected area.

6. The object detection apparatus according to claim 1, wherein
the processing circuitry classifies into one of at least one of clusters, each detection point included in the detection result point group, removes from among the at least one of clusters, a cluster that includes a detection point which is less than a first threshold value, calculates based on at least one cluster that has not been removed, a representative point indicating position coordinates at which the object is estimated to be actually present, and by regarding as noise, a detection point that is not the calculated representative point, removes from the detection result point group, the detection point corresponding to the noise.

7. The object detection apparatus according to claim 6, wherein
the processing circuitry regards as a target cluster, each of the clusters that have not been removed when there are a plurality of clusters in the at least one cluster that has not been removed, calculates an average distance which is an average value of distances each of which corresponds to each of position coordinates included in the target cluster and an average angle which is an average value of angles each of which corresponds to each of the position coordinates included in the target cluster, groups two or more clusters when there are two or more clusters in which a difference in the average distance is mutually less than or equal to a second threshold value and a difference in the average angle is mutually equal to or greater than a third threshold value, regards as a valid cluster, each of a cluster other than a cluster that includes the number of detection points which is less than a fourth threshold value, among clusters included in a group of the two or more clusters, and of a cluster that has not been grouped among the clusters that have not been removed, and calculates the representative point based on each valid cluster.

8. The object detection apparatus according to claim 7, wherein
the processing circuitry decides whether or not a point is the representative point, depending on properties of the reception signal corresponding to each detection point included in each valid cluster.

9. The object detection apparatus according to claim 1, wherein
the processing circuitry removes from the detection result point group, a detection point corresponding to noise, based on the position coordinates of each detection point included in the detection result point group in a past time range.

10. The object detection apparatus according to claim 9 is installed on a moving body, wherein
the processing circuitry removes from the detection result point group, a detection point corresponding to noise, based on a speed of the moving body.

11. An object detection method comprising:
regarding as a target reception signal, each of a plurality of reception signals which is a signal received by each of a plurality of receivers and is a signal corresponding to a transmission signal which is a signal transmitted by a transmitter and reflected by an object, detecting as a target peak, each of at least one of peaks corresponding to the target reception signals, and calculating as a calculated distance, a distance corresponding to the target peak;
calculating a detection point indicating position coordinates indicating a position at which the object is estimated to be present, based on each combination of the calculated distance corresponding to each of the plurality of reception signals, a position of the transmitter, and each position of the plurality of receivers, and regarding as a detection result point group, a set that consists of the calculated detection points; and
removing from the detection result point group, a detection point corresponding to noise, based on the position coordinates of each detection point included in the detection result point group.

12. A non-transitory computer readable-medium storing an object detection program causing an object detection apparatus which is a computer to execute:
a distance calculation process to regard as a target reception signal, each of a plurality of reception signals which is a signal received by each of a plurality of receivers and is a signal corresponding to a transmission signal which is a signal transmitted by a transmitter and reflected by an object, to detect as a target peak, each of at least one of peaks corresponding to the target reception signals, and to calculate as a calculated distance, a distance corresponding to the target peak;
a position coordinate calculation process to calculate a detection point indicating position coordinates indicating a position at which the object is estimated to be present, based on each combination of the calculated distance corresponding to each of the plurality of reception signals, a position of the transmitter, and each position of the plurality of receivers, and to regard as a detection result point group, a set that consists of the calculated detection points; and
a noise removal process to remove from the detection result point group, a detection point corresponding to noise, based on the position coordinates of each detection point included in the detection result point group.

* * * * *